US008568611B2

(12) United States Patent
Ceder et al.

(10) Patent No.: US 8,568,611 B2
(45) Date of Patent: Oct. 29, 2013

(54) OXIDE COATINGS ON LITHIUM OXIDE PARTICLES

(75) Inventors: Gerbrand Ceder, Wellesley, MA (US); ByoungWoo Kang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 840 days.

(21) Appl. No.: 12/449,116

(22) PCT Filed: Jan. 25, 2008

(86) PCT No.: PCT/US2008/001052
§ 371 (c)(1),
(2), (4) Date: Dec. 28, 2009

(87) PCT Pub. No.: WO2008/091707
PCT Pub. Date: Jul. 31, 2008

(65) Prior Publication Data
US 2010/0163790 A1    Jul. 1, 2010

Related U.S. Application Data

(60) Provisional application No. 60/897,324, filed on Jan. 25, 2007.

(51) Int. Cl.
| *H01M 4/88* | (2006.01) |
| *C01D 1/02* | (2006.01) |
| *C01D 1/00* | (2006.01) |
| *C01D 15/02* | (2006.01) |
| *C01D 17/00* | (2006.01) |

(52) U.S. Cl.
USPC ............... 252/182.1; 423/594.4; 423/641; 977/773

(58) Field of Classification Search
USPC .......... 252/182.1; 423/594.4, 641; 427/126.3, 427/388.5; 429/217, 218, 219, 223, 231.1; 977/773
See application file for complete search history.

(56) References Cited

U.S. PATENT DOCUMENTS 5,538,814 A    7/1996    Kamauchi et al.
(Continued)

FOREIGN PATENT DOCUMENTS

| JP | 2002075368 | 3/2002 |
| WO | WO 03/092099 A1 | 11/2003 |

(Continued)

OTHER PUBLICATIONS

A. K. Podh, K. S. Nanjundoswcmy, and J. B. Goodenough, Phospho-olivines as Positive-Electrode Materials for Rechargeable Lithium Batteries, J. Electrochem. Soc., vol. 144, No. 4, 1188-1194, Apr. 1997 The Electrochemical Society, Inc.*

(Continued)

*Primary Examiner* — Bijan Ahvazi
(74) *Attorney, Agent, or Firm* — Wolf, Greenfield & Sacks, P.C.

(57) ABSTRACT

The present invention generally relates to unique coatings for use with energy storage particles, such as lithium oxide energy storage materials. The invention provides unique coatings for particles, unique particle/coating combinations, and unique methods for making coatings and/or coated particles. In one aspect of the invention, a particle is formed having a core and a coating. The particle may comprise a core having a material such as $LiFePO_4$, and a coating. The particle may be formed, in some embodiments, by using a non-stoichiometric combination of salts or other precursors, and sintering the same to form particles. $LiFePO_4$ may form as the core of the particle, while the remaining materials may form a coating around the $LiFePO_4$. Typically, the $LiFePO_4$ is crystalline while the coating is generally amorphous, and in some instances, the coating may prevent large crystals of $LiFePO_4$ from forming. However, in other embodiments, a coating may be applied to a particle after formation of the particle to form a core/coating structure. The particles disclosed herein may have a relatively high energy capacity, and thus may find use in batteries and other energy storage devices. Other aspects of the invention relate to devices comprising such particles, methods of making such particles, kits for making such particles, methods of promoting the making or use of such particles, and the like.

20 Claims, 40 Drawing Sheets

(56) References Cited

U.S. PATENT DOCUMENTS

| | | |
|---|---|---|
| 5,614,334 A | 3/1997 | Kamauchi et al. |
| 5,705,296 A | 1/1998 | Kamauchi et al. |
| 5,804,335 A | 9/1998 | Kamauchi et al. |
| 5,858,465 A | 1/1999 | Hunt et al. |
| 5,989,745 A | 11/1999 | Kamauchi et al. |

FOREIGN PATENT DOCUMENTS

| | | | |
|---|---|---|---|
| WO | WO 2004/095607 A2 | | 11/2004 |
| WO | WO 2006/027925 A2 | * | 3/2006 |

OTHER PUBLICATIONS

C. Delacourt, C. Wurm, L. Laffont, J.-B. Leriche, C. Masquelier, Electrochemical and electrical properties of Nb- and/or C-containing LiFePO4 composites, Solid State Ionics 177 (2006) 333-341.*

Office Communication for International Application No. 08724849.8-2122, dated Jul. 12, 2009.

International Search Report/Written Opinion in PCT/US2008/001052, dated Oct. 14, 2008.

Chang et al., "Synthesis and performance of $LiMn_{0.7}Fe_{0.3}P_{04}$ cathode material for lithium ion batteries," *Mat Res Bull* 40 (2005) 1513-1520.

Delacourt et al., "Electrochemical and electrical properties of Nb- and/or C-containing $LiFePO_4$ composites," *Solid State Ionics* 177 (2006) 333-341.

Padhi et al., "Phospho-olivines as Positive-Electrode Materials for Rechargeable Lithium Batteries," *J Electrochem Soc*, 144 (1997) 1188-1194.

Rabaa et al., "Electronic and Structural Effects of Nitrogen Doping on the Ionic Conductivity of $\gamma$-$Li_3PO_4$," *J Solid State Chem* 145 (1999) 619-628.

Wang et al., "Effect of $LiFePO_4$ coating on electrochemical performance of $LiCoO_2$ at high temperature," *Solid State Ionics* 178 (2007) 131-136.

Zaghib et al., "Unsupported claims of ultrafast charging of $LiFePO_4$ Li-ion batteries," *J Power Sources* (2008), doi:10.1016/j.jpowsour.2009.05.043.

* cited by examiner

OXIDE COATINGS ON LITHIUM OXIDE PARTICLES

RELATED APPLICATIONS

This application claims the benefit of U.S. Provisional Patent Application Ser. No. 60/897,324, filed Jan. 25, 2007, entitled "Oxide Coatings on Lithium Oxide Particles," by Ceder, et al., incorporated herein by reference.

GOVERNMENT FUNDING

Research leading to various aspects of the present invention were sponsored, at least in part, by the National Science Foundation, Grant No. DMR-0213282. The U.S. Government may have certain rights in the invention.

FIELD OF INVENTION

The present invention generally relates to certain lithium containing materials. Such materials are of interest in various energy storage applications.

BACKGROUND $LiMPO_4$ materials, where M is a transition metal, are of interest for energy storage applications, for example, rechargeable lithium batteries. An example of a suitable transition metal is iron. Due to the demand for lightweight, high energy density batteries, for example, to power vehicles or portable electronic devices, improvements in the energy storage of such materials are needed.

SUMMARY OF THE INVENTION

The present invention generally relates to certain lithium oxide materials. The subject matter of the present invention involves, in some cases, interrelated products, alternative solutions to a particular problem, and/or a plurality of different uses of one or more systems and/or articles.

In one aspect, the invention is directed to an article. The article, in one set of embodiments, includes a coated particle having a core and a coating surrounding at least a portion of the core. In one embodiment, the coating has a composition $Li_xM_yP_zN_wO_m$, where x, z, w, and m are each independently greater than 0, and y is greater than or equal to 0. In another embodiment, the coating has a composition $Li_xM_yP_zN_wC_vO_4$, where x, z, and w are each independently greater than 0, y is greater than or equal to 0, and at least one of w and v is greater than 0. In yet another embodiment, the particle has an overall composition $Li_xM_yP_zO_4$, wherein the quantity $(x/z)$ is a number between about 1 and about 2, and the quantity $(1-y)/(1-z)$ is a number between about 1 and about 3.4 or about 2.5. In these structures, M may be a transition metal, such as iron, manganese, cobalt, nickel, etc. The transition metals, as is known to those of ordinary skill in the art, are those elements in the d-block of the Periodic Table, e.g., Groups 3 through 12.

The particle, in another embodiment, has an overall composition $Li_xM_yP_zO_4$, where x is between about 0.01 and about 1.1, y is between about 0.5 and about 1.1, and z is between about 0.5 and about 1.1. M may be a transition metal, such as iron, manganese, cobalt, nickel, etc. In some cases, the particle is formed by a process comprising sintering one or more precursors at a temperature of less than about 800° C. to produce the particle. In certain instances, the particle, upon being charged to a maximum of 5.2 V, is able to give, upon discharge to 2.5 V, a capacity of at least about 100 mA h/g at a current rate of at least 170 mA/g.

In still another embodiment, the particle has an overall composition $Li_xM_yP_zN_wO_4$, where x is between about 0.01 and about 1.1, y is between about 0.5 and about 1.1, z is between about 0.5 and about 1.1, and w is between 0 and about 0.1. According to yet another embodiment, the particle has an overall composition $Li_xM_yP_zC_vO_4$, where x is between about 0.01 and about 1.1, y is between about 0.5 and about 1.1, z is between about 0.5 and about 1.1, and v is between 0 and about 0.1. In another embodiment, the particle has an overall composition $Li_xM_yP_zN_wC_vO_4$, where x is between about 0.01 and about 1.1, y is between about 0.5 and about 1.1, z is between about 0.5 and about 1.1, w is between about 0 and about 0.1 and v is between 0 and about 0.1. In these structures, M may be a transition metal, such as iron, manganese, cobalt, nickel, etc.

In another set of embodiments, the article includes a coated particle having an overall composition $Li_xM_yP_zO_4$, where x is between about 0.01 and about 1.1, y is between about 0.5 and about 1.1, and z is between about 0.5 and about 1.1. In one embodiment, the particle comprises a core comprising $LiMPO_4$, and a coating surrounding at least a portion of the core. In another embodiment, the quantity $(1-y)/(1-z)$ is a number between about 0.3 and about 1. M may be a transition metal, such as iron, manganese, cobalt, nickel, etc.

The article, in still another set of embodiments, includes a coated particle comprising a core comprising $LiMPO_4$, and a coating surrounding at least a portion of the core. M may be a transition metal, such as iron, manganese, cobalt, nickel, etc. In one embodiment, the particle is formed by a process comprising sintering one or more precursors at a temperature of less than about 800° C. to produce the particle. In another embodiment, the particle, when charged to a maximum of 5.2 V, gives, upon discharge to 2.5 V, a capacity of at least about 100 mA h/g at a current rate of at least 170 mA/g.

The article, in yet another set of embodiments, includes a coated particle comprising a core comprising crystalline $LiMPO_4$, and a coating surrounding at least a portion of the core. M may be a transition metal, such as iron, manganese, cobalt, nickel, etc. In certain cases, the core has an average grain size of less than about 150 nm, for instance, less than about 100 nm, less than about 50 nm, or less than about 10 nm.

Still another set of embodiments of the present invention are directed to energy storage particles. In one embodiment, an energy storage particle is formed by a process comprising sintering a compound comprising lithium, a compound comprising iron, manganese, cobalt, and/or nickel, and a compound containing nitrogen and phosphorous at a temperature of less than about 800° C. to produce the particle. In another embodiment, an energy storage particle is formed by a process comprising sintering one or more precursors at a temperature of less than about 800° C. to produce the particle. The particle, when charged to a maximum of 5.2 V, may give, upon discharge to 2.5 V, a capacity of at least about 100 mA h/g at a current rate of at least 170 mA/g.

In yet another embodiment, at least a portion of the energy storage particle consists essentially of crystalline $LiMPO_4$. M may be a transition metal, such as iron, manganese, cobalt, nickel, etc. In some cases, the particle, when charged to a maximum of 5.2 V, gives, upon discharge to 2.5 V, a capacity of at least about 100 mA h/g at a current rate of at least 170 mA/g.

In one set of embodiments, an article of the invention includes a coated particle comprising a core comprising $LiMPO_4$, and a coating that appears amorphous in transmission electron microscopy (TEM), for example, in TEM diffractive measurement. In some cases, the particle may have an overall composition $Li_xM_yP_zO_4$, where x is between about 0.01 and about 1.1, y is between about 0.5 and about 1.1, and z is between about 0.5 and about 1.1. In one embodiment, the particle is formed by a process comprising sintering one or more precursors at a temperature of less than about 800° C. to produce the particle. The particle, when charged to a maximum of 5.2 V, may give, upon discharge to 2.5 V, a capacity of at least about 100 mA h/g at a current rate of at least 170 mA/g. In these structures, M may be a transition metal, such as iron, manganese, cobalt, nickel, etc.

In another set of embodiments, an article of the invention includes a coated particle comprising a core comprising $LiMPO_4$, and a second portion that appears amorphous in transmission electron microscopy (TEM), for example, in TEM diffractive measurement. In some cases, the particle may have an overall composition $Li_xM_yP_zO_4$, where the quantity (x/z) is a number between about 1 and about 2, and the quantity (1−y)/(1−z) is a number between about 1 and about 3.4, or between about 1 and about 2.5. In one embodiment, the particle is formed by a process comprising sintering one or more precursors at a temperature of less than about 800° C. to produce the particle. The particle, when charged to a maximum of 5.2 V, may give, upon discharge to 2.5 V, a capacity of at least about 100 mA h/g at a current rate of at least 170 mA/g. In these structures, M may be a transition metal, such as iron, manganese, cobalt, nickel, etc.

The article includes a matrix, according to another set of embodiments. In one embodiment, the matrix has a composition $Li_xM_yP_zN_wO_m$, where x, y, z, w, and m are each independently greater than 0. In another embodiment, the matrix has an overall composition $Li_xM_yP_zO_4$, where x is between about 0.01 and about 1.1, y is between about 0.5 and about 1.1, and z is between about 0.5 and about 1.1. In some of these cases, the matrix comprises particles having a composition $LiMPO_4$. In these structures, M may be a transition metal, such as iron, manganese, cobalt, nickel, etc.

One set of embodiments includes an article including a coated particle comprising the elements Li, M, P, and O in a ratio of x:y:z:4, where x is between about 0.01 and about 1.1, y is between about 0.5 and about 1.1, and z is between about 0.5 and about 1.1. In some instances, the particle comprises a core comprising $LiMPO_4$, and a coating surrounding at least a portion of the core. Another set of embodiments includes an article including a particle comprising the elements Li, M, P, and O in a ratio of x:y:z:4, where x is between about 0.01 and about 1.1, y is between about 0.5 and about 0.95, z is between about 0.5 and about 0.95, and the quantity (1−y)/(1−z) is a number between about 0.3 and about 1. In these structures, M may be a transition metal, such as iron, manganese, cobalt, nickel, etc.

Still another set of embodiments includes an article comprising a coated particle having a core and a coating surrounding at least a portion of the core. In one embodiment, the particle may comprise the elements Li, M, P, and O in a ratio of x:y:z:4, where the quantity (x/z) is a number between about 1 and about 2, and the quantity (1−y)/(1−z) is a number between about 1 and about 3.4, or between about 1 and about 2.5. The particle, in another embodiment, may comprise the elements Li, M, P, and O in a ratio of x:y:z:4, where x is between about 0.01 and about 1.1, y is between about 0.5 and about 1.1, and z is between about 0.5 and about 1.1. In some cases, the particle is formed by a process comprising sintering one or more precursors at a temperature of less than about 800° C. to produce the particle. In yet another embodiment, the particle may comprise the elements Li, M, P, and O in a ratio of x:y:z:4, where x is between about 0.01 and about 1.1, y is between about 0.5 and about 1.1, and z is between about 0.5 and about 1.1. The particle, upon being charged to a maximum of 5.2 V, may give, upon discharge to 2.5 V, a capacity of at least about 100 mA h/g at a current rate of at least 170 mA/g. In these structures, M may be a transition metal, such as iron, manganese, cobalt, nickel, etc.

Another aspect of the invention is directed to a method. In one set of embodiments, the method includes acts of exposing an energy storage particle able to store an electronic charge to one or more precursors, and sintering the one or more precursors at a temperature of less than about 800° C. In another set of embodiments, the method includes an act of sintering an energy storage particle comprising $LiMPO_4$ with a source of lithium at a temperature of less than about 800° C. in a reducing atmosphere. In yet another set of embodiments, the method includes an act of sintering an energy storage particle comprising $LiMPO_4$ with a source of nitrogen at a temperature of less than about 800° C. in a reducing atmosphere. In these structures, M may be a transition metal, such as iron, manganese, cobalt, nickel, etc.

The method, in one set of embodiments, includes an act of crystallizing $LiMPO_4$ within an amorphous matrix.

In another set of embodiments, the method includes an act of promoting use of a material to store energy in a battery. In one embodiment, the material has an overall composition $Li_xM_yP_zO_4$, where x is between about 0.01 and about 1.1, y is between about 0.5 and about 1.1, and z is between about 0.5 and about 1.1. In some cases, the material comprises at least a first portion comprising $LiMPO_4$, and a second portion that is distinguishable from the first portion. According to another embodiment, the material has an overall composition $Li_xM_yP_zO_4$, where the quantity (x/z) is a number between about 1 and about 2, and the quantity (1−y)/(1−z) is a number between about 1 and about 3.4, or between about 1 and about 2.5. In certain instances, the material comprises at least a first portion comprising $LiMPO_4$, and a second portion that is distinguishable from the first portion. In these structures, M may be a transition metal, such as iron, manganese, cobalt, nickel, etc.

In another aspect, the present invention is directed to a method of making one or more of the embodiments described herein. In another aspect, the present invention is directed to a method of using one or more of the embodiments described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to unique coatings for use with energy storage particles, such as lithium oxide energy storage materials. The invention provides unique coatings for particles, unique particle/coating combinations, and unique methods for making coatings and/or coated particles. In some embodiments, the invention provides unique methods for making small particles.

A rechargeable Li battery typically has electrodes that exchange Li during charge and discharge. The rate at which this Li can be exchanged is important in many applications where high charge and/or discharge rates are required for the battery. In order to achieve high rate capability, $Li^+$ ions and electrons have to be able to rapidly move through the electrode structure to the surface of the active materials, and then be rapidly adsorbed by the active material. For a cathode material, $Li^+$ and electrons are adsorbed during the discharge of the battery, and this process is reversed during the charge. Though the present invention is not limited to cathodes, as used herein, "charging" indicates Li removal and "discharging" refers to Li insertion.

$LiFePO_4$, a material with many desirable battery properties, is understood to be a poor electron conductor and generally only lets Li diffuse in through one particular crystal surface. Hence, it is important to rapidly move $Li^+$ ions and electrons over the surfaces of $LiFePO_4$, and to keep particle size small so that ions and electrons do not have to travel far in order to insert into the material. In contrast, in some aspects of the present invention, a coating is provided that enables rapid transport of ions and electrons. At the same time, in many embodiments, particle size is kept small during synthesis.

Figure 1:
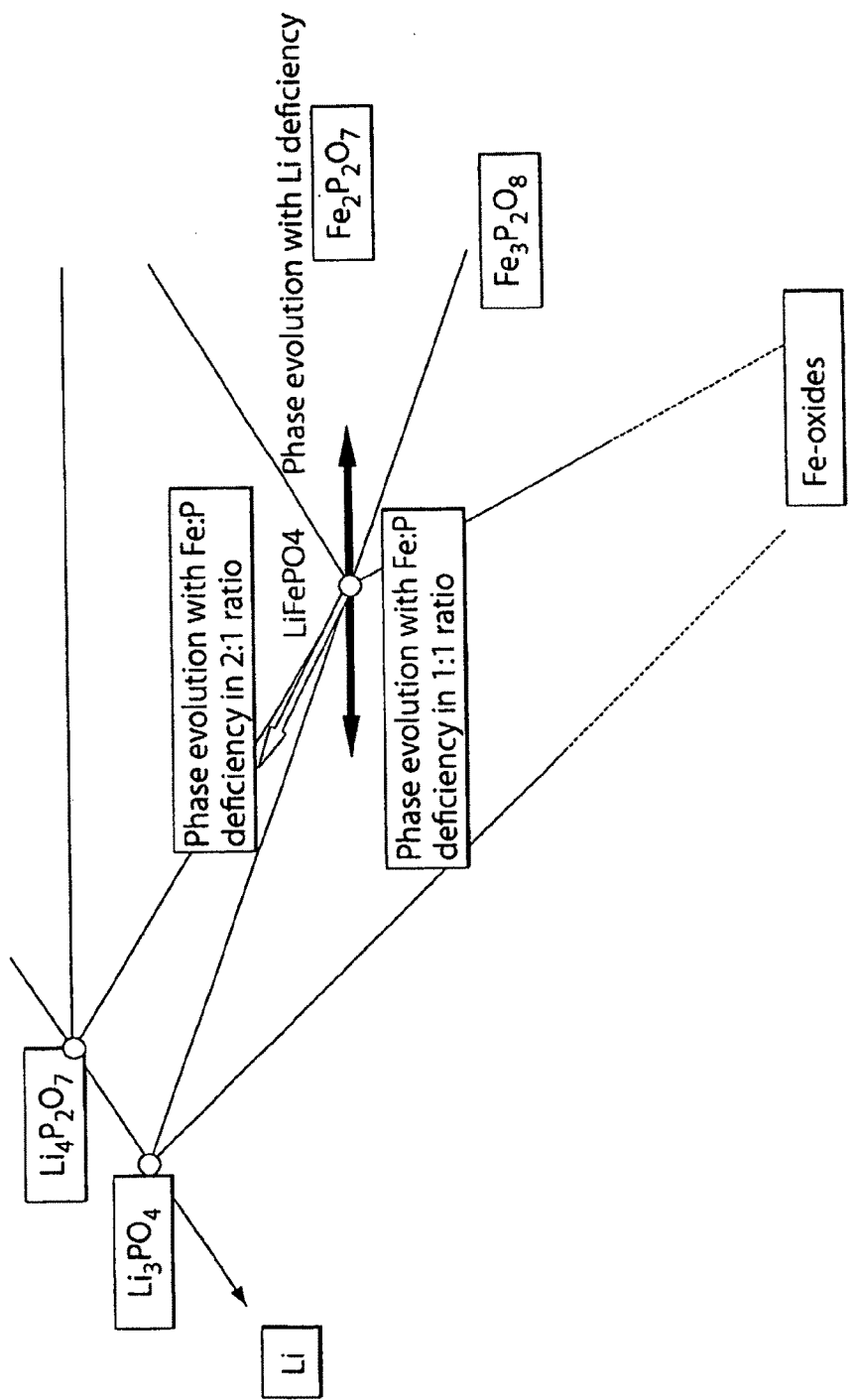
FIG. 1 shows a schematic diagram of a portion of a Li—Fe—P—O phase diagram.

Li phosphates are generally known to be reasonable good solid state conductors of $Li^+$ ions. In particular, $Li_3PO_4$, when doped with nitrogen atoms, can be used as a solid state electrolyte in a solid-thin film battery. FIG. 1 shows a relevant section of the Li—Fe—P—O phase diagram. It should be understood that this is only a schematic diagram, and that the details of the phases present can depend on various synthesis conditions, such as oxygen partial pressure, temperature, the presence of impurities, etc. However, in certain aspects of the invention, coatings are formed that are compositionally near $Li_3PO_4$ and $Li_4P_2O_7$ with the incorporation of some Fe and N. It should be understood that the coating does not have to be present as distinct crystalline phases of these compounds, but can be present as a mixture with approximately this composition in some embodiments. In certain embodiments of the invention, the coating material is actually amorphous, as discussed in detail below. In one embodiment, the coating is prepared in situ on $LiFePO_4$ materials by starting with a non-stoichiometric mixture of reagents such that $LiFePO_4$ and other materials are formed in a single process. FIG. 1 thus shows that one off-stoichiometric method that can be employed is to reduce the Fe and P content of the material in a ratio of about 2:1. This may create, for example, a Li phosphate-rich material, in addition to the formation $LiFePO_4$. Such off-stoichiometric methods are surprising since, in the prior art, off-stoichiometry was believed to have a negative impart on performance, and created phases such as Fe-oxides or Fe-phosphates. For instance, off-stoichiometric ratios of Fe and P in a ratio of 1:1 were believed to be inefficient and undesirable, as it was expected to produce inactive and insulating Fe oxides.

Figure 8A:
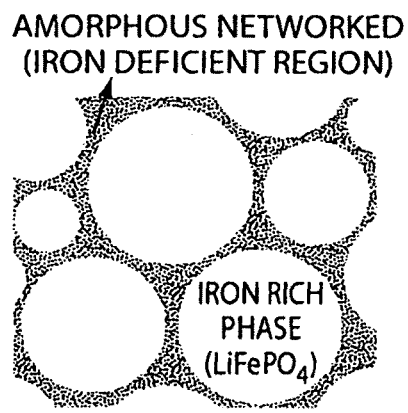
FIGS. 8A-8C are schematic diagrams illustrating crystallizing $LiFePO_4$ within an amorphous matrix.
Figure 8B:
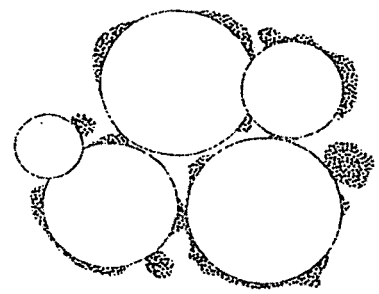
Figure 8C:
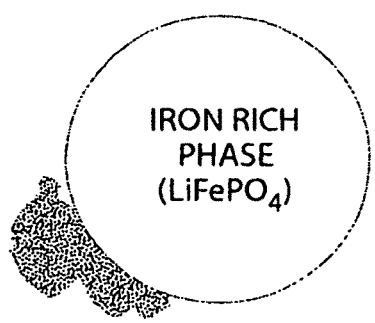

In one aspect of the invention, a particle is formed having a core and a coating. The particle may comprise a core having a material such as $LiMPO_4$, and a coating, where M is a transition metal such as iron, manganese, cobalt, nickel, etc. The particle may be formed, in some embodiments, by using a non-stoichiometric combination of salts or other precursors, and sintering the same to form particles. $LiMPO_4$ may form as the core of the particle, while the remaining materials may form a coating around the $LiMPO_4$. Typically, the $LiMPO_4$ is crystalline while the coating is generally amorphous, and in some instances, the coating may prevent large crystals of $LiMPO_4$ from forming. However, in other embodiments, a coating may be applied to a particle after formation of the particle to form a core/coating structure. In some cases, multiple "cores" may be present within a particle, surrounded by a coating, e.g., as is shown in FIG. 8. The particles disclosed herein may have a relatively high energy capacity, and thus may find use in batteries and other energy storage devices. Other aspects of the invention relate to devices comprising such particles, methods of making such particles, kits for making such particles, methods of promoting the making or use of such particles, and the like.

Several aspects of the invention are generally directed to coated particles. A coating particle may have a core and coating surrounding at least a portion of the core. In some embodiments, the core and the coating are formed at the same time; in other cases, the core is first formed, then the coating is applied to the core. As discussed in detail below, the core may be, in certain embodiments, an energy storage particle known to the art, while the coating surrounding at least a portion of the core may be unique, as disclosed herein. Generally, the core and the cladding can be separately identified within a coated particle. For example, the core and the cladding may be identified as having different structures (e.g., different degrees of crystallinity or crystal structure), different compositions, and/or different morphologies (e.g., being readily identifiable as a core and a coating surrounding the core, which is often relatively thin), and such regions may be readily identified using techniques such as light microscopy or TEM (transmission electron microscopy). Other techniques are described in detail below. Thus, for example, relative amounts of crystal structure (ranging from, e.g., purely crystalline, microcrystalline, poorly crystalline, or amorphous) may be determined for a particle, and used to determine the presence of the core and the coating. As a specific example, a coated particle may comprise a crystalline core and a coating that is less crystalline (e.g., crystalline but to a lesser degree, microcrystalline, or even amorphous).

In some cases, two or more particles may "fuse" during formation, resulting in a combination of particles including more than one core, and/or aggregates in which there is a discrete phase (cores) and a continuous phase (the coatings, which may be thought of as a matrix containing the cores). Accordingly, it should be understood that although "core" and "cladding" are often used herein in singular form, this is by way of example only, and in other embodiments, a particle may contain multiple cores, there may be an aggregate of particles having the features discussed herein, etc. The particles may be distributed within the matrix in any manner, e.g., homogeneously, heterogeneously, etc. In some cases, the matrix may be porous.

Typically, a particle will have an average diameter of less than about 5 micrometers, where the "average diameter" is the diameter of a perfect sphere having the same volume as the particle. In some cases, the particle may have an average diameter of less than about 1 micrometer, less than about 750 nm, less than about 500 nm, less than about 250 nm, less than about 100 nm, less than about 75 nm, or less than about 50 nm. In some cases, the coating comprises a relatively small portion of the particle. For example, the coating may have an average thickness of less than about 250 nm, less than about 200 nm, less than about 150 nm, less than about 100 nm, less than about 70 nm, less than about 50 nm, less than about 20 nm, less than about 15 nm, or less than about 10 nm.

In one set of embodiments, the particle has an overall composition of:

$Li_xM_yP_zO_m$, where x, y, z, and m are each independently greater than 0, and M is a transition metal such as iron, manganese, cobalt, nickel, or the like. O may be normalized to 4 in certain cases. In other cases, m may be, for instance, between about 1.6 and about 5.4, between about 3 and about 5.4, or between about 3 and about 4, etc. As used herein, the "overall composition" of a particle is the average composition of the particle, irrespective of location of the elements within the particle, the physical structure of the particle (e.g., whether within the core or coating), the molecular composition of the particle, etc. Thus, x, y, and z are not necessarily integers, but can be fractions or decimals, and in some cases, Li, M, P, and O are present in non-stoichiometric ratios. Thus, for example, x may be between about between about 0.01 and about 1.1, and in some cases, between about 0.5 and about 1.1, between about 0.75 and about 1.1, between about 0.9 and about 1.1, or between about 0.95 and about 1.05. Similarly, y may be between about 0.5 and about 1.1, and in some cases, between about 0.75 and about 1.1, between about 0.9 and about 1.1, or between about 0.95 and about 1.05. z may independently be between about 0.5 and about 1.1, and in some cases, between about 0.75 and about 1.1, between about 0.9 and about 1.1, or between about 0.95 and about 1.05. In some cases, y is not equal to z, and in certain instances, y is less than z, i.e., the particle contains more P than M. In certain cases, as discussed in detail below, non-stoichiometric ratios of Li, M, P, and/or O are used to form the particles.

As another example, in some cases, there may be specific ratios of x, y, and/or z within the particle, i.e., specific ratios of Li, M, and/or P. For instance, in one embodiment, the quantity (x/z), representing a ratio of Li to P in the overall particle, is a number between about 1 and about 2. For example, (x/z) may be about 1.2, about 1.4, about 1.6, about 1.8, or about 2. Surprisingly, the use of such non-stoichiometric ratios does not result in an inoperative material, i.e., one not suitable for storing energy, but instead it has been found that the use of such non-stoichiometric ratios may result, under certain conditions as described herein, in the formation of a core that comprises $LiFePO_4$ and can be used for storing energy, and a coating surrounding the core. In some embodiments, the quantity (x/z) is between about 1 and about 1.5, between about 1 and about 1.4, between about 1 and about 1.3, between about 1.05 and about 1.2, between about 1.05 and about 1.15, etc.

As another example, the quantity (1−y)/(1−z) can be a number between about 1 and about 3.4, or between about 1 and about 2.5, where (1−y)/(1−z) is, generally speaking, a measure of the relative deficiencies of M and P, relative to Li and O within the overall particle. In some cases, the quantity (1−y)/(1−z) is a number between about 1.5 and about 2.5, about 1.7 and about 2.3, between about 1.8 and about 2.2, or between about 1.9 and about 2.1.

As yet another example, the absolute value of the quantity (2z−y−1) (i.e., the quantity |2z−y−1|) may be less than about 0.3, less than about 0.2, or less than about 0.1, i.e., the deficiency of M is roughly twice the deficiency with respect to P, relative to Li and O. In one embodiment, the particle has an overall composition $LiFe_{1-2a}P_{1-a}O_4$, i.e., where, relative to the composition $Li_xM_yP_zO_m$, x=1, y=1−2a, and z=1−a, a being a number between 0 and 1, typically between 0 and 0.5.

In certain embodiments of the invention, a nitrogen source may be used to incorporate N into the coating. For instance, the particle, in another set of embodiments, may have an overall composition of:

$Li_xM_yP_zN_wO_m$, where x, y, z, w, and m are each independently greater than 0, and M is a transition metal, such as iron, manganese, cobalt, nickel, etc. In some cases, O may be normalized to m=4. In other cases, m may be, for instance, between about 1.6 and about 5.4, between about 3 and about 5.4, or between about 3 and about 4, etc. w may be between about 0.01 and about 1.1 or between 0 and about 0.1, and x, y, and z are the same as discussed above (including the above-described ratios between x, y, and z). Such particles are similar to the $Li_xM_yP_zO_4$, other than the addition of N. It is believed that the addition of N to the particle may enhance ionic conductivity, e.g., Li ion transport through the coating.

In still another set of embodiments, a particle of the invention may contain Li, M, P, and C, where M is a transition metal, such as iron, manganese, cobalt, nickel, or the like. For instance, the particle, in another set of embodiments, may have an overall composition of:

$Li_xM_yP_zC_vO_m$, where x, y, z, v, and m are each independently greater than 0. In some cases, O is normalized to m=4. In other cases, m may be, for instance, between about 1.6 and about 5.4, between about 3 and about 5.4, or between about 3 and about 4, etc. In some embodiments, v may be between about 0.01 and about 1.1 or between 0 and about 0.1, and x, y, and z are the same as discussed above (including the above-described ratios between x, y, and z). Such particles are similar to those described above.

In yet another embodiment, a particle of the invention may contain Li, M, P, N, and C, where M is a transition metal; for example a particle, in another set of embodiments, may have an overall composition of:

$$Li_xM_yP_zN_wC_vO_m,$$

where x, y, z, w, v, and m are each independently greater than 0. O may be normalized to 4 in certain cases. In other cases, m may be, for instance, between about 1.6 and about 5.4, between about 3 and about 5.4, or between about 3 and about 4, etc. In some instances, v and w may each independently be between about 0.01 and about 1.1 or between 0 and about 0.1, and x, y, and z are the same as discussed above (including the above-described ratios between x, y, and z).

In still another set of embodiments, a particle of the invention contains Li, M, P, and O, in ratios such that the ratio of Li:M:P:O can be defined as x:y:z:4, where x, y, and z are defined as above (i.e., O is normalized to 4). M is a transition metal, such as iron, manganese, cobalt, nickel, etc. The particle may also contain other species. For instance, the particle may also contain N and/or C, and/or other elements such as H. However, in one embodiment, the particle is essentially free from C. The elemental composition of a particle can be measured using techniques known to those of ordinary skill in the art, for example inductively coupled plasma (ICP) techniques.

A coated particle, according to one aspect of the invention, comprises a coating having one of the following compositions:

$$Li_xM_yP_zO_m, Li_xM_yP_zN_wO_m, Li_xM_yP_zC_vO_m, Li_xM_yP_zN_wC_vO_m,$$

where x, z, w, v, and m are each independently greater than 0, and M is a transition metal, such as iron, manganese, cobalt, nickel, etc. y may be greater than or equal to 0 in some cases (i.e., in some embodiments, there may be no transition metal present in the coating). m can be normalized to 4 in some cases. In other cases, m may be, for instance, between about 1.6 and about 5.4, between about 3 and about 5.4, or between about 3 and about 4, etc. In some cases, the quantity (y/x) is a number less than about 0.4, less than about 0.3, less than about 0.2, or less than about 0.1, where (y/x) represents a ratio of M to L. In certain embodiments, the quantity (x/z), representing a ratio of Li to P in the overall particle, is a number between about 1 and about 2. For example, (x/z) may be between about 1.25 and about 3, between about 1.5 and about 3, between about 2 and about 3, etc. In one embodiment, m is greater than the quantity (x+2y+5z)/2 and less than the quantity (x+3y+5z)/2. Generally, this quantity is a measure of the valence or oxidation state of M within the coating, which may be between about +2 and about +3. The oxidation state of M may be determined by the charge balance within the coating.

In one aspect, a coated particle comprises a core that is crystalline, or at least essentially crystalline. The crystalline part of a material can be determined using techniques known to those of ordinary skill in the art, for example, by applying X-ray diffractive measurement, e.g., X-ray diffraction (XRD), electron diffraction techniques, or observation using transmission electron microscopy, e.g., via TEM diffractive measurements.

As a non-limiting example, copper metal (characteristic wavelength of 1.5401 Angstroms) can be used as an X-ray source in XRD. The materials may be prepared in powder form (e.g., by using an agate mortar), and the X-rays directed at the powder. After interaction, the X-rays are reflected or transmitted, and these X-rays typically will have different wavelengths from the incident beam. Crystalline materials typically will have a series of sharp, discrete peaks when studied using such techniques, for example, as determined by measuring XRD peak broadening or comparison of the peaks at FHWM (full width at half maximum). Poorly crystalline or amorphous materials may have larger FHWM values or large peak broadening, as compared to crystalline materials. For example, an XRD data may show an "amorphous hump," which is a broad hump around a low angle range (typically less than 30°. The amorphous phase can also be characterized, e.g., using Rietveld refinement with a reference phase, usually silicon or $Al_2O_3$. In addition, the amorphous phase can be determined in some cases using XRD measurements on different temperature samples.

Electron diffraction and transmission electron microscopy (TEM) can also be used to determine crystal structure. These techniques typically will have finer spatial resolution than XRD, and can be used to observe local variations in crystal structure. Such techniques can be used by those of ordinary skill in the art to distinguish the core from the coating, e.g., when the latter is amorphous or poorly crystallized. For example, for electron diffraction, the electron beam can be directed at different regions of a sample (e.g., at the core and the coating of a particle), and the degree of diffraction of those regions can be determined to determine crystal structure. Thus, an electron beam directed at a core may exhibit a high degree of diffraction, indicating that the core is crystalline, while the electron beam directed at a coating may exhibit no diffraction, or a relatively low degree of diffraction, indicating that the coating is amorphous or poorly crystalline.

In some embodiments, the grain size of the crystalline material may also be determined, for example, using techniques such as transmission electron microscopy (TEM). For instance, the core may have an average grain size of less than about 150 nm, less than about 100 nm, less than about 50 nm, less than about 30 nm, less than about 20 nm, less than about 10 nm, or less than about 5 nm in some cases. As discussed below, the grain size of such particles, in some cases, can be controlled.

In one set of embodiments, the core comprises $LiMPO_4$, which may be present in crystalline form as some cases. Such a crystalline core may, in some cases, consist essentially of $LiMPO_4$, as impurities or deviations from the $LiMPO_4$ core may be excluded via systems and methods such as those discussed below. As above, M may be a transition metal, such as iron, manganese, cobalt, nickel, or the like.

The coating, according to one aspect, may not be fully crystalline, and may appear to be amorphous when examined by TEM, i.e., no areas can be observed in electron diffraction images of the coating that would be indicative of the presence of a crystalline phase within the coating. Such a coating may be amorphous, or may have some degree of crystal structure (e.g., having a microcrystalline structure). The TEM may be performed in imaging mode (e.g., producing images for subsequent study), or in diffraction mode (e.g., producing diffraction patterns indicative of the amount of crystal structure). A coating may thus appear amorphous if there is no crystalline signal when the coating of the particle is measured or otherwise determined using TEM. For example, in TEM diffraction mode, a crystalline material will have several spots, corresponding to crystalline structure or atomic periodicity, while an amorphous or poorly crystalline material may not produce such spots. As another example, in HR-TEM (high-resolution TEM), crystalline materials will typically exhibit a lattice fringe or structure, while amorphous materials will exhibit no lattice fringe. See, e.g., FIG. 4A, which shows crystalline regions (characterized generally by parallel linear structures) and amorphous regions (which do not exhibit such structures).

Various elements may be present within the coating (which may include elements excluded from the core during formation of the core, or other elements present when the particle was formed. For example, the coating may comprise Li, P, M, N and/or C, where M is a transition metal, such as iron, manganese, cobalt, nickel, or the like. Such materials may be present within the coating due to exclusion of such atoms from the core in processes where the core is crystallized. In some aspects, the coating may be both ionically conductive (e.g., to Li ions) and electronically conductive (to electrons).

Another technique that may be used to determine a coating, and properties of the coating (e.g., crystal structure) is X-ray photoelectron spectroscopy (XPS). Those of ordinary skill in the art will be aware of XPS techniques. In general, in XPS, X-rays are directed at a sample (or portions of the sample), and the energy of the ejected electrons (photoelectrons) are measured to determined the binding energy of the electrons, which are used to determine the surface composition.

The coating may be distinguished from the core, in some embodiments, by comparison of XRD measurements or other measurements that measure crystal structure of the bulk of the sample, and TEM or other surface measurements that measure crystal structure of the surface of the sample. Differences between the bulk measurements and the surface measurements can then be used to determine the presence and/or properties of the core and of the coating.

The coating, in some cases, is formed through the exclusion of materials from the crystalline core. For example, if a non-stoichiometric overall composition of $Li_xM_yP_zO_4$ is used, phase separation may occur, producing the coating. In some cases, the choice of precursors may result in a non-stoichiometric overall composition. For example, by introducing iron and phosphorous precursors, a non-stoichiometric composition may result. As a specific example, without wishing to be bound to any theory, a composition having a formula $LiFe_{1-2a}P_{1-a}O_4$ may react as follows:

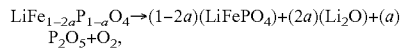
$$LiFe_{1-2a}P_{1-a}O_4 \rightarrow (1-2a)(LiFePO_4)+(2a)(Li_2O)+(a)P_2O_5+O_2,$$

where a is a number between 0 and 1, typically 0 and 0.5. The portion $(1-2a)(LiFePO_4)$ may facilitate formation of the core, while the portions $(2a)(Li_2O)$ and/or $(a)P_2O_5$ may form the coating of the particles. The substances $Li_2O$ and $P_2O_5$ need not form discrete phases, but may form a glassy mixture in some cases, e.g., having a nominal composition between $Li_3PO_4$ and $Li_4P_2O_7$. In one embodiment of the invention, the remainder of the composition (after $LiMPO_4$ is formed) forms a single-phase glassy phase that includes Li, P, and O, with small amounts of Fe, Mn, Ni, Co, and/or N.

Yet another aspect of the invention is directed to systems and methods for making such particles. In one set of embodiments, a particle having such characteristics may be produced by sintering one or more precursors at a temperature of less than about 800° C. to produce the particle. Precursors of the particle may include salts or other species having the elements present in the final particle (e.g., Li, P, Fe, Mn, Ni, Co, and/or N), and may have other species that may be driven off during the sintering process (for example, 0, H, etc.). The precursors, prior to sintering, are finely divided in some embodiments, e.g., by ball milling.

As non-limiting examples of precursors, a precursor of lithium may be a salt or other compound comprising lithium, for instance, lithium carbonate ($Li_2CO_3$) or lithium phosphate ($Li_3PO_4$). A precursor of iron may be a salt or other compound comprising iron, for example, iron oxalate ($FeC_2O_4$), iron (II) carbonate ($FeCO_3$), and/or iron acetate ($Fe(CH_3COO)_2$). A precursor of manganese may be a salt or other compound comprising manganese, for instance, manganese carbonate ($MnCO_3$). A precursor of phosphorous may be a salt or other compound comprising phosphorous, for example, lithium phosphate ($Li_3PO_4$) or ammonium dihydrogen phosphate ($NH_4H_2PO_4$). A precursor of nitrogen may be a salt or other compound comprising nitrogen, for example, lithium nitrate ($LiNO_3$), ammonium nitrate ($NH_4NO_3$), ammonium dihydrogen phosphate ($NH_4H_2PO_4$), and/or diammonium hydrogen phosphate (($NH_4)_2HPO_4$); other, non-limiting examples of nitrogen precursors include compounds comprising the ammonia ion ($NH_4^+$), the nitrate ion ($NO_3^-$), and/or the nitrite ion ($NO_2^-$). In some cases, a precursor compound may be a precursor of more than one of Li, P, Fe, Mn, Co, Ni and/or N (e.g., $LiNO_3$ or $NH_4H_2PO_4$). Precursors of lithium, iron (or another transition metal), and phosphorous, when sintered together, may result in the production of $LiFePO_4$ or $LiMPO_4$. If the precursors are present in non-stoichiometric ratios (e.g., there is a deficiency of Fe and/or P), particles having non-stoichiometric overall compositions such as those described above may form. Without wishing to be bound to any theory, it is believed that materials such as $LiFePO_4$ forms stoichiometrically within the core of the particle, while excess Li, Fe, and/or P may be excluded to form a coating around the particle. Thus, the coating is formed in such cases in the same process that produces the core. As discussed, in certain cases, the $LiMPO_4$ core may be crystalline or essentially crystalline, while the coating, which contains Li, Fe, Mn, Ni, Co, and/or P, and possibly other species (e.g., N and/or C) may be amorphous, or at least appear amorphous in standard characterization tools such as electron microscopy. However, in one embodiment, the precursors do not include C, such that the particle formed thereby is free (or at least essentially free) of carbon.

In some cases, as previously discussed, the particle may comprise nitrogen (N) and/or carbon (C). Nitrogen and/or carbon may be introduced from a precursor, e.g., a salt or other compound containing nitrogen and/or carbon, and/or the nitrogen and/or carbon may be introduced when the precursors are sintered, e.g., from a nitrogen-containing material present in the atmosphere, such as ammonium $Li_3N$, $NH_4H_2PO_4$, ($NH_4)_2HPO_4$, $NH_4NO_3$, ($NH_4)_2C_2O_4 \cdot 2H_2O$, and/or ($NH_4)_3Fe(C_2O_4)_3 \cdot xH_2O$.

In some cases, the particles may be sintered at relatively low temperatures, for example, less than about 800° C., less than about 750° C., or less than about 700° C. Lower temperatures may allow an amorphous coating to form on the particle, and in some cases, the amorphous coating (or matrix) may restrict grain growth within the core of the particle. Thus the size of the crystals of $LiMPO_4$ formed within the core may be controlled by controlling growth of the amorphous coating or matrix surrounding the crystalline $LiMPO_4$. For instance, as is shown in FIG. 8, at lower sintering temperatures, the formation of a matrix may prevent, or at least restrict, grain growth (FIG. 8A); at higher sintering temperatures, more crystallization occurs, and the amorphous matrix does not as effectively prevent or restrict grain growth (FIGS.

8B and 8C). Restriction of grain growth may be useful to allow higher rates of charging/discharging of the particles when used for energy storage, as discussed below.

In some embodiments, sintering of the precursors occurs in a reducing atmosphere. A reducing atmosphere is one that does not contain molecular oxygen ($O_2$), and/or other oxidizing species. For example, the reducing atmosphere may comprise $H_2$ and/or $H_2O$, CO and/or $CO_2$, $N_2$, Ar or other noble gases, $NH_3$, etc., and all combinations thereof. The reducing atmosphere, in some cases, may be generated, at least in part, from sintering the precursor compounds. As a specific non-limiting example, carbon contained within the precursor may be sintered to form CO and/or $CO_2$, which may contribute to the reducing atmosphere. In certain cases, $O_2$ may be present, but at a concentration less than the atmospheric concentration of $O_2$, including concentrations in which only a negligible amount of oxidation occurs during the sintering process. In some cases, sintering of the precursors in a reducing atmosphere may facilitate core/coating formation, and/or incorporation of nitrogen into the particle.

Other steps may be present in the sintering process. For example, in some cases, the precursors are heated at lower temperatures to decompose organic sources such as carbonates, oxalates, etc. For instance, the precursors may be first heated at temperatures of less than about 300° C., less than about 350° C., or less than about 400° C. In some cases, the precursors may be heated under an inert and/or a reducing atmosphere.

In another set of embodiments, particles of the present invention may be produced by coating a suitable core with an amorphous coating. After production of the core (e.g., a $LiFePO_4$ core) by any suitable technique (including ball milling, solution mixing, etc.), including those described herein (e.g., using stoichiometric ratios), or other particles known to those of ordinary skill in the art, a coating may be applied to the cores. The coating may be formed from precursors, for example, precursors having non-stoichiometric ratios of one or more of Li, P, Fe, Mn, or N. The coating may be sintered onto the core using techniques such as those described above. In some cases, the precursors may be finely divided, e.g., by ball milling. It should be noted that the core is not necessarily $LiFePO_4$, but may be any suitable material, for example, any particle able to store an electronic charge. For instance, the core may comprise a $LiMPO_4$ material, where M is any metal, for example, a transition metal such as manganese, cobalt, nickel, etc.

According to various aspects of the invention, materials such as those described herein may be used in a wide variety of purposes. In one set of embodiments, the materials can be used as battery materials, for instance, for use in power tools, hybrid electric vehicles, portable electronic devices, laptop computers, and the like. According to such embodiments, the materials of the invention may be able to store charge, e.g., electronic charge.

For instance, in one set of embodiments, the particles may exhibit a relatively high charge density or energy density, i.e., the capacity of the particles to contain electric charge, e.g., as measured in charge per unit volume. Particles having such properties may be useful for applications such as rechargeable lithium batteries and similar applications, where the storage of electrical energy is desired. For example, in some instances, a particle of the invention may exhibit an energy density or capacity of at least about 100 mA h/g, and in some cases, at least about 110 mA h/g, at least about 120 mA h/g, and in some cases, at least about 130 mA h/g, at least about 140 mA h/g, at least about 150 mA h/g, at least about 160 mA h/g, or at least about 170 mA h/g, etc. as measured at a discharge rate of 1 C (C=170 mA/g). As another example, in some cases, particles of the invention can exhibit an energy density or capacity of at least about 50 mA h/g, at least about 60 mA h/g, at least about 80 mA h/g, or at least about 100 mA h/g as measured at a discharge rate of 60 C. Such energy densities may be measured, for example, by using the particles as a positive electrode in an electrochemical cell against a Li anode, charging the particles to a maximum of 4.6 V, 4.9 V, or 5.2 V (relative to an uncharged state), then discharging the particles to 2.5 V at a rate of at least about 170 mA/g. The current density at the particles, when used as an electrode, should be less than about 1 $mA/cm^2$ of electrode surface. In still another set of embodiments, the particles of the invention may exhibit enhanced cycling characteristics (i.e., the ability to be charged and discharged repeatedly), relative to other particles.

The invention also involves, in some aspects, the promotion of the use of a material to store energy in a battery according to any of the techniques and compositions described herein. As used herein, "promoted" includes all methods of doing business including, but not limited to, methods of selling, advertising, assigning, licensing, contracting, instructing, educating, researching, importing, exporting, negotiating, financing, loaning, trading, vending, reselling, distributing, replacing, or the like that can be associated with the methods and compositions of the invention, e.g., as discussed herein. Promoting may also include, in some cases, seeking approval from a government agency. Methods of promotion can be performed by any party including, but not limited to, businesses (public or private), contractual or sub-contractual agencies, educational institutions such as colleges and universities, research institutions, governmental agencies, etc. Promotional activities may include instructions or communications of any form (e.g., written, oral, and/or electronic communications, such as, but not limited to, e-mail, telephonic, facsimile, Internet, Web-based, etc.) that are clearly associated with the invention. As used herein, "instructions" can define a component of instructional utility (e.g., directions, guides, warnings, labels, notes, FAQs ("frequently asked questions"), etc., and typically involve written instructions on or associated with the composition and/or with the packaging of the composition. Instructions can also include instructional communications in any form (e.g., oral, electronic, digital, optical, visual, etc.), provided in any manner such that a user will clearly recognize that the instructions are to be associated with the composition, e.g., as discussed herein.

The following documents are incorporated herein by reference: U.S. Provisional Patent Application Ser. No. 60/721,885, filed Sep. 29, 2005, entitled "Oxides Having High Energy Densities," by Ceder, et al.; U.S. patent application Ser. No. 11/333,800, filed Jan. 17, 2006, entitled "Oxides Having High Energy Densities," by Ceder, et al.; and International Patent Application No. PCT/US2006/037838, filed Sep. 29, 2006, entitled "Oxides Having High Energy Densities," by Ceder, et al. Also incorporated herein by reference is U.S. Provisional Patent Application Ser. No. 60/897,324, filed Jan. 25, 2007, entitled "Oxide Coatings on Lithium Oxide Particles," by Ceder, et al.

The following examples are intended to illustrate certain embodiments of the present invention, but do not exemplify the full scope of the invention.

Example 1

This example illustrates the production of particles using an in situ coating technique. The starting materials in this example were lithium carbonate (Li$_2$CO$_3$), iron oxalate (FeC$_2$O$_4$.2H$_2$O), and NH$_4$H$_2$PO$_4$. Ball milling in an acetone solvent was used to form a homogeneous mixture. The ball milling container was a polypropylene bottle and the ball millers were spherical zirconia balls (having radii of 3 mm or 5 mm). Ball milling was performed overnight (about 12 h). After ball milling, the homogenized mixture was dried using a hot plate with magnetic stirring. The dried materials were pelletized by a disk type mold using a manual press.

A two-step heating method was used. Heating was performed under argon (Ar) to prevent iron (II) oxidation. First, the material was heated to 350° C. to decompose the organic sources (carbonate, oxalate, and ammonium dihydrogen phosphate). This was performed under Ar using a tube furnace. Next, the materials were ground by an agate mortar. The materials were then heated at 700° C. under Ar. After finishing heat treatment, the resulting particles were characterized using various techniques, including SEM and XRD.

Figure 2A:
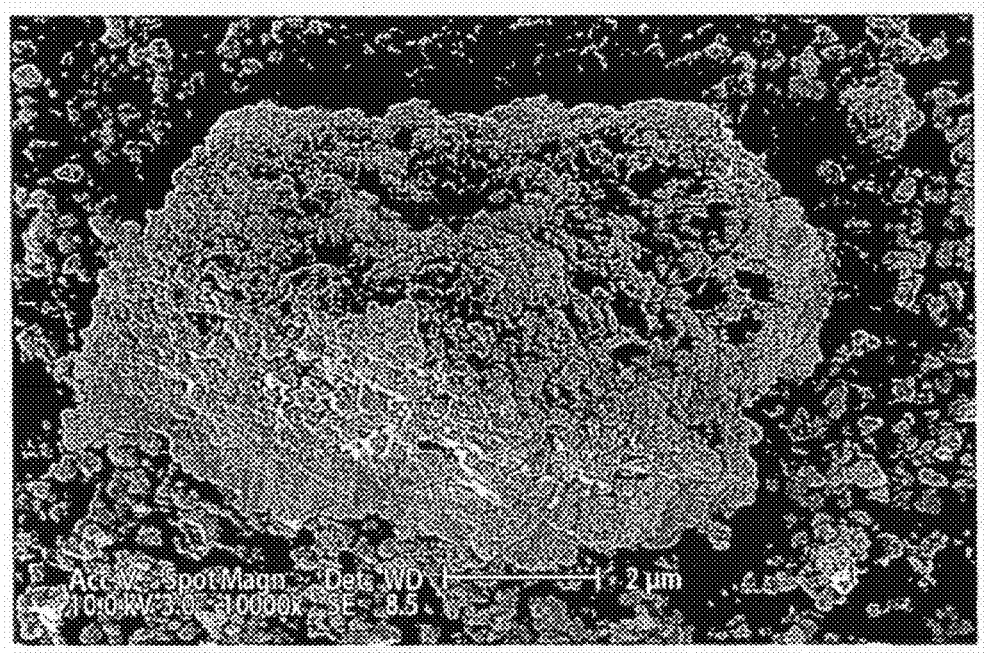
FIGS. 2A-2F are SEM photomicrographs illustrating various particles formed using in situ techniques, according to one embodiment of the invention.
Figure 2B:
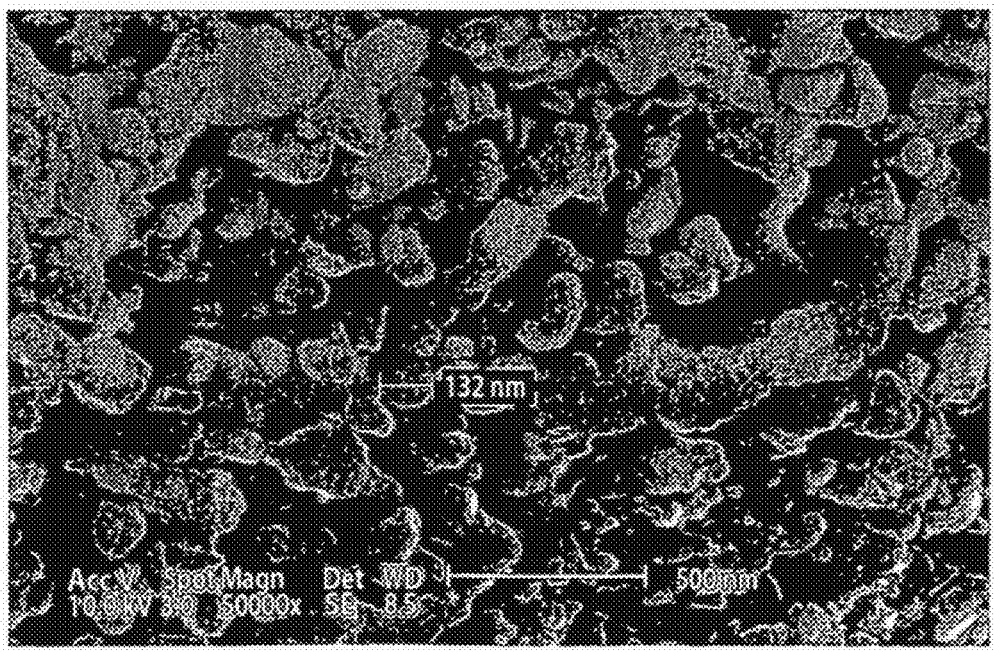
Figure 2C:
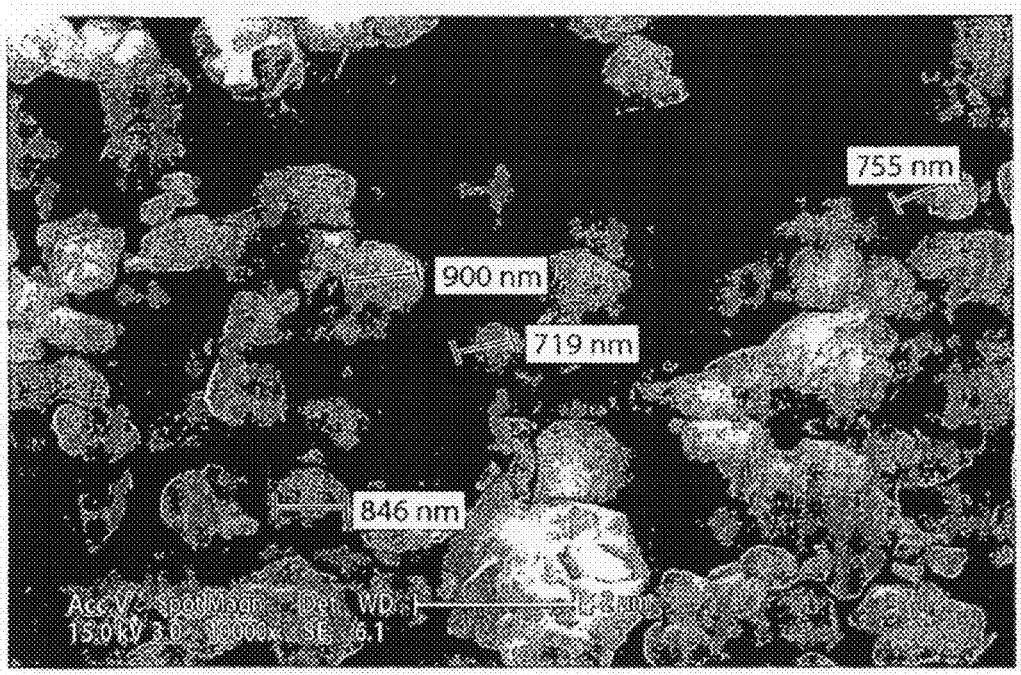

Several samples were made either varying the ratio of the reactants to change the stoichiometry, or varying the annealing atmosphere. A stoichiometric sample was made from Li$_2$CO$_3$ (0.9369 g), FeC$_2$O$_4$.2H$_2$O (4.5619 g), and NH$_4$H$_2$PO$_4$ (2.9169 g) according to the procedure outlined above using an Ar atmosphere to heat the materials. FIGS. 2A and 2B are SEM images of this material and show LiFePO$_4$ (no coating present). The particle size is roughly 150 nm. The final composition of the particles was LiFePO$_4$/Fe$_2$P (minor amount). FIG. 2C illustrates similar particles formed using the precursors LiOH.H$_2$O (1.0491 g), Fe$_2$O$_3$ (1.9961 g), and NH$_4$H$_2$PO$_4$ (2.8758 g) under 5% H$_2$ and 95% Ar. The final compositions of these particles was LiFePO$_4$/Li$_3$PO$_4$ (minor amount)/Fe$_2$P(minor amount).

Figure 2D:
Figure 2E:
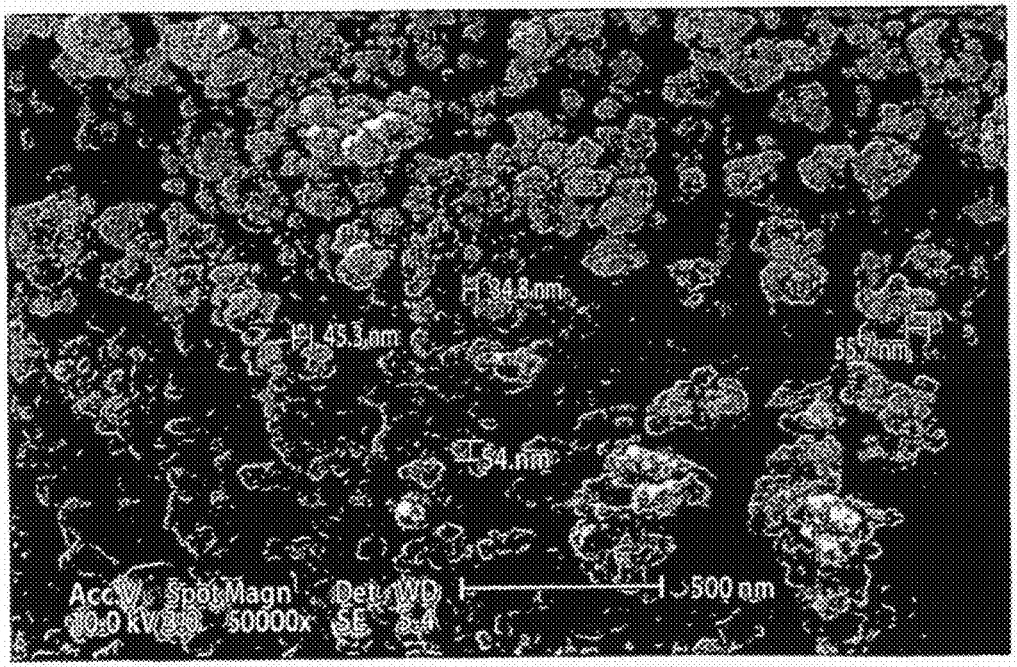

Non-stoichiometric particles were formed using the precursors Li$_2$CO$_3$ (0.9369 g), FeC$_2$O$_4$.2H$_2$O (4.1057 g), and NH$_4$H$_2$PO$_4$ (2.7710 g) under Ar. The overall composition of product synthesized by these reactants is LiFe$_{1-2a}$P$_{1-a}$O$_{4-\delta}$, where a is 0.05. FIGS. 2D and 2E are SEM images for in situ coated particles produced non-stoichiometrically. The particle size in these images is roughly 50 nm. The final composition of the core was LiFePO$_4$/Fe$_2$P(small amount). As a result, the coating was amorphous or crystalline material with a composition in the range of Li$_4$P$_2$O$_7$ to Li$_3$PO$_4$ with small amounts of iron, C, and N. X-ray photoelectron spectroscopy (XPS) was used to show that nitrogen is present on the surface.

Figure 2F:
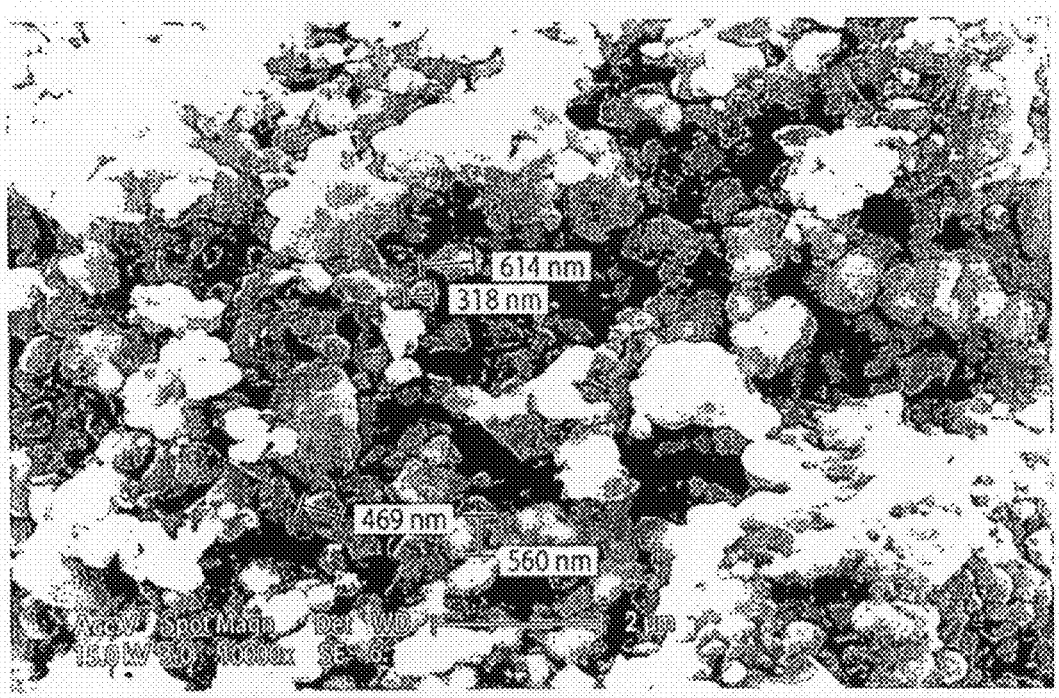

FIG. 2F illustrates similar non-stoichiometric particles formed using the precursors LiOH.H$_2$O (1.0491 g), Fe$_2$O$_3$ (1.7965 g), and NH$_4$H$_2$PO$_4$ (2.7320 g) under 5% H$_2$ and 95% Ar. As shown here, the off-stoichiometry makes for smaller particle size, which may improve the performance of the electrode material. The composition of the core of these particles was LiFePO$_4$/Fe$_2$P(small amount)/Li$_3$PO$_4$ (small amount)/Li$_4$P$_2$O$_7$ (small amount). The coating included the Li-phosphate glass phase. XPS again indicated nitrogen incorporation into the surface.

Figure 4A:
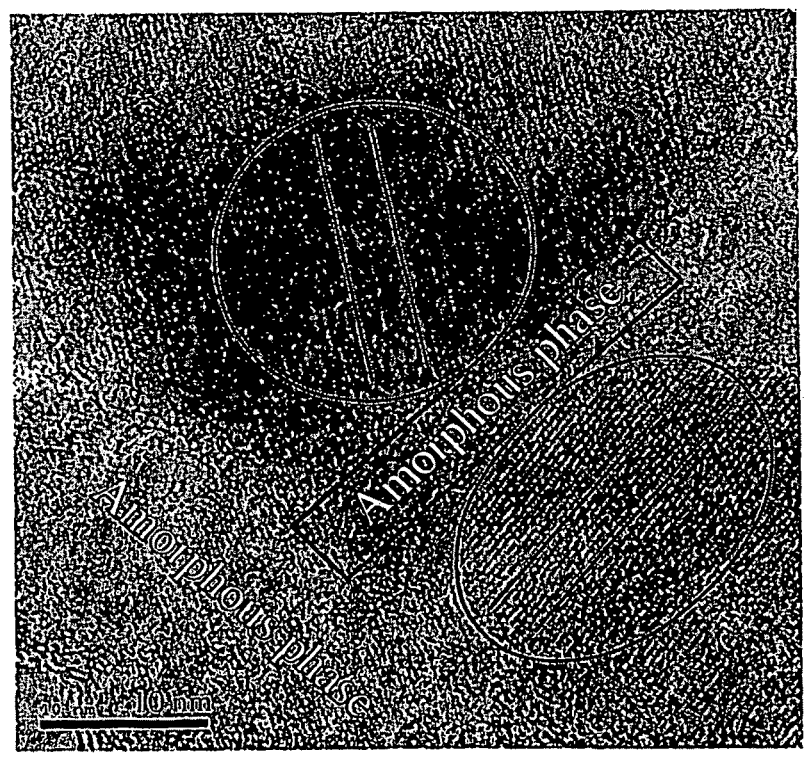
FIGS. 4A-4C are TEM photomicrographs illustrating various particles formed using in situ techniques, according to one embodiment of the invention.
Figure 4B:
Figure 4C:

FIGS. 4A and 4B are TEM images of in situ coated particles produced non-stoichiometrically. The amorphous coating phase was found to have a thickness of less than about 10 nm. The precursors in this example were Li$_2$CO$_3$ (0.9369 g), FeC$_2$O$_4$.H$_2$O (4.1057 g), and NH$_4$H$_2$PO$_4$ (2.7710 g) under Ar. In FIG. 4C, a similar TEM image is shown, with a particle having a coating of less than about 10 nm. The final composition of the core was LiFePO$_4$/Fe$_2$P(minor amount) and the coating was similar to the coating in the previous examples.

Figure 6:
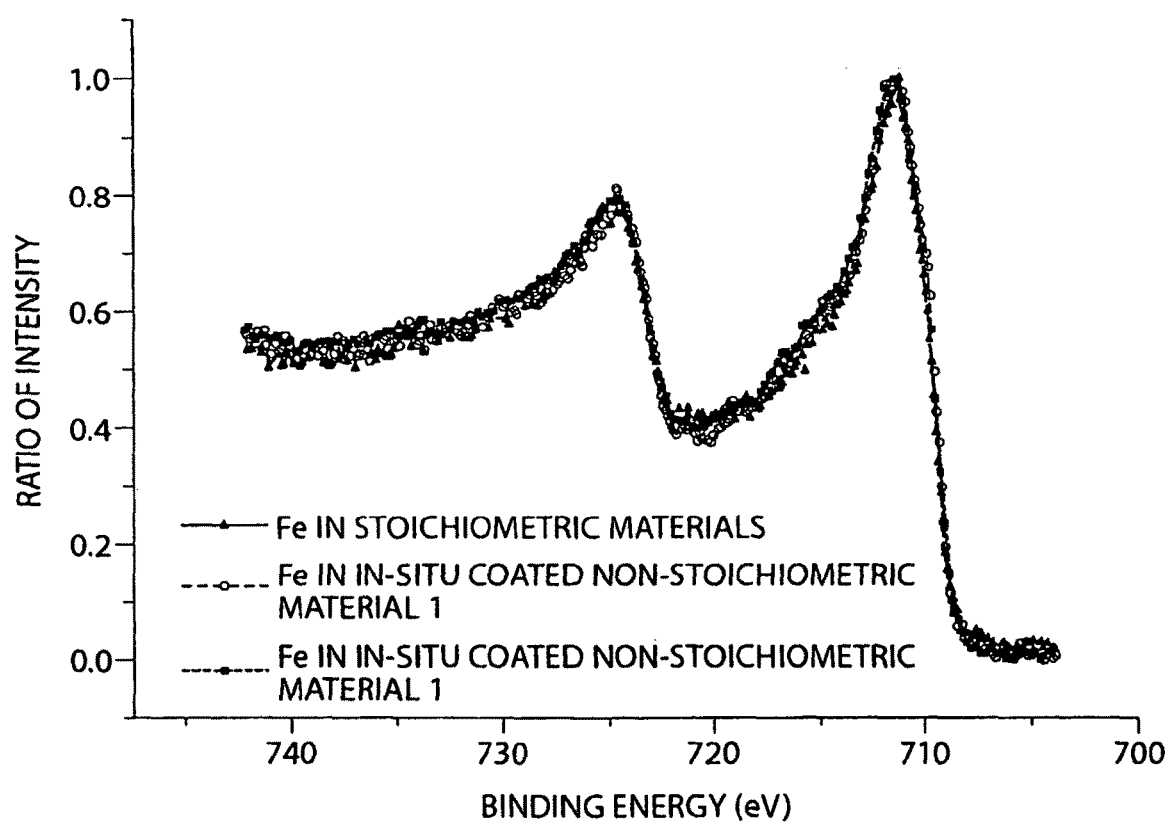
FIG. 6 is XPS data illustrating stoichiometric and non-stoichiometric materials, in one embodiment of the invention.
Figure 7:
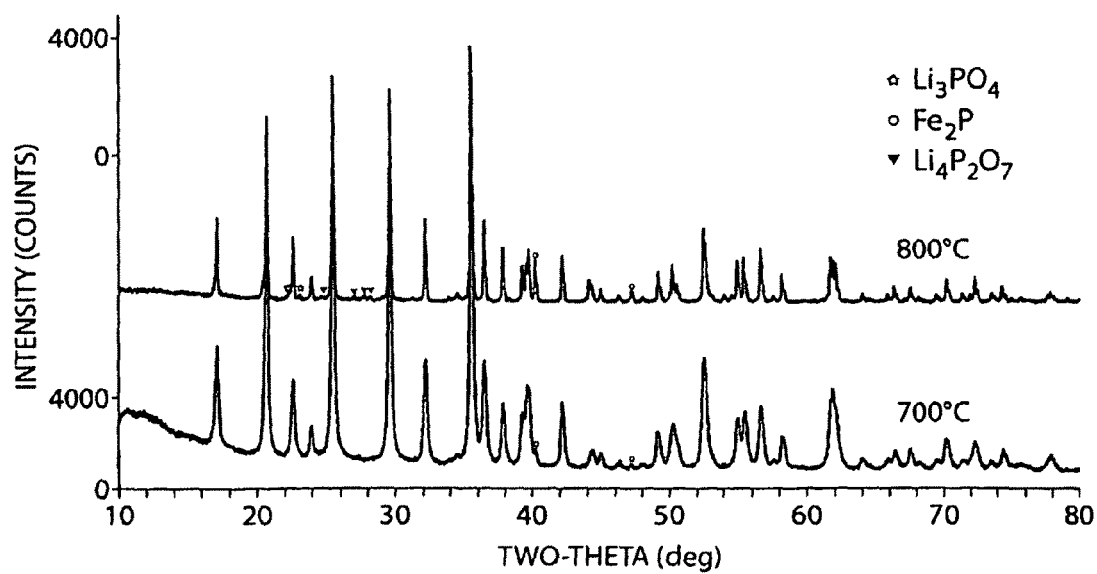
FIG. 7 is XRD data illustrating an in situ non-stoichiometric material produced according to one embodiment of the invention.

FIG. 6 is an XPS scan for both a stoichiometric material and two in situ coated non-stoichiometric materials. The iron environments, in both cases, are very similar. FIG. 7 shows XRD data for an in situ coated non-stoichiometric material. This material was fired at 800° C. At this higher firing temperature (800° C.) the amorphous coating appeared to crystallize into Li$_4$P$_2$O$_7$, Li$_3$PO$_4$, and/or Fe$_2$P.

Example 2

In this example, an ex situ process for producing a coating on previously synthesized particles is demonstrated. Two materials were separately prepared. One is a coating material synthesized by combining Li$_2$CO$_3$, NH$_4$H$_2$PO$_4$, and small amount of FeC$_2$O$_4$.2H$_2$O using ball-milling with a zirconia ball. Starting quantities were Li$_2$CO$_3$ (0.9369 g), FeC$_2$O$_4$.2H$_2$O (0.2281 g), and NH$_4$H$_2$PO$_4$ (1.4583 g). The molar ratio of Li, P, and Fe in the coating material was 2:1:0.1. Based on computer simulations, it is believed that this composition will result a substance with an approximate composition of Li$_4$P$_2$O$_7$ with a small amount of iron. Therefore, the coating material had Li, P, Fe, C (from FeC$_2$O$_4$.2H$_2$O), and N (from NH$_4$H$_2$PO$_4$). C and N could be present in the coating material because of the reducing atmosphere that the material was prepared in. However, it is believed that the amount of C is less than the amount of N. A small amount of transition metal may improve properties of the coating material, such as ionic and/or electronic conductivity. Thus, the composition of the coating material was approximately:

$$Li_2PFe_{0.1}C_xN_y (x \ll y).$$

The other material prepared in this example was an olivine LiFePO$_4$ material, for example, an olivine material synthesized by using the precursors LiOH—H$_2$O (1.0639 g), Fe(NO$_3$)$_3$.9H$_2$O (10.2436 g), and NH$_4$H$_2$PO$_4$ (2.9165 g) under 5% H$_2$/95% Ar. This olivine material was coated using the techniques described herein. Coating material with the composition described above was applied to the standard olivine material synthesized from an iron nitrate source. The two materials (coating material and normal olivine material) were mixed together to make a homogeneous mixture using ball milling for about 2 days, with a zirconia ball in acetone solvent, or manually ground by mortar and pestle before heating to make coating. The weight ratio of the two materials was 1:0.1 (olivine to coating material). After homogeneous mixing (ball milling or manual mixing with magnetic stirring), the mixture was heated to form a surface coating at a temperature below where olivine synthesis occurs (e.g., at around 550° C.) under a reducing atmosphere (N$_2$, Ar, H$_2$/CO$_2$/CO, or NH$_3$). This heating caused a surface coating to form on the olivine material, without altering the bulk properties of the olivine material. As shown in this example, the particle size and bulk structure from XRD measurements were similar to before coating.

Figure 3A:
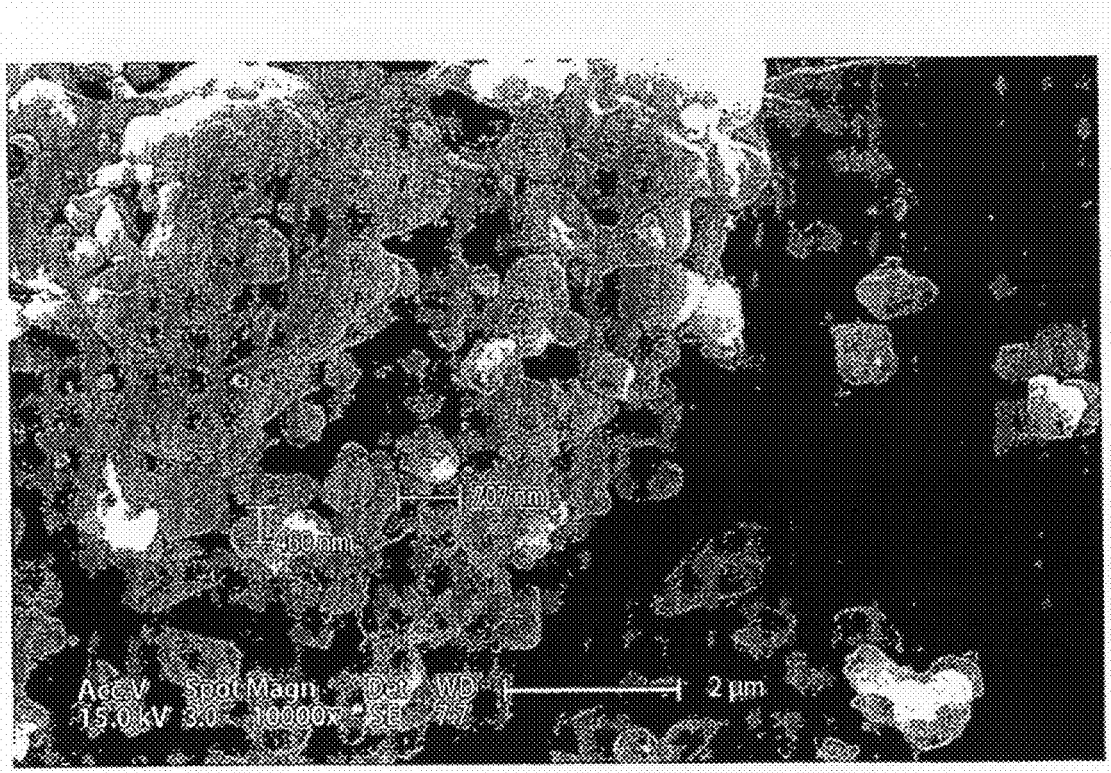
FIGS. 3A-3C are SEM photomicrographs illustrating various particles formed using ex situ techniques, according to another embodiment of the invention.
Figure 3B:
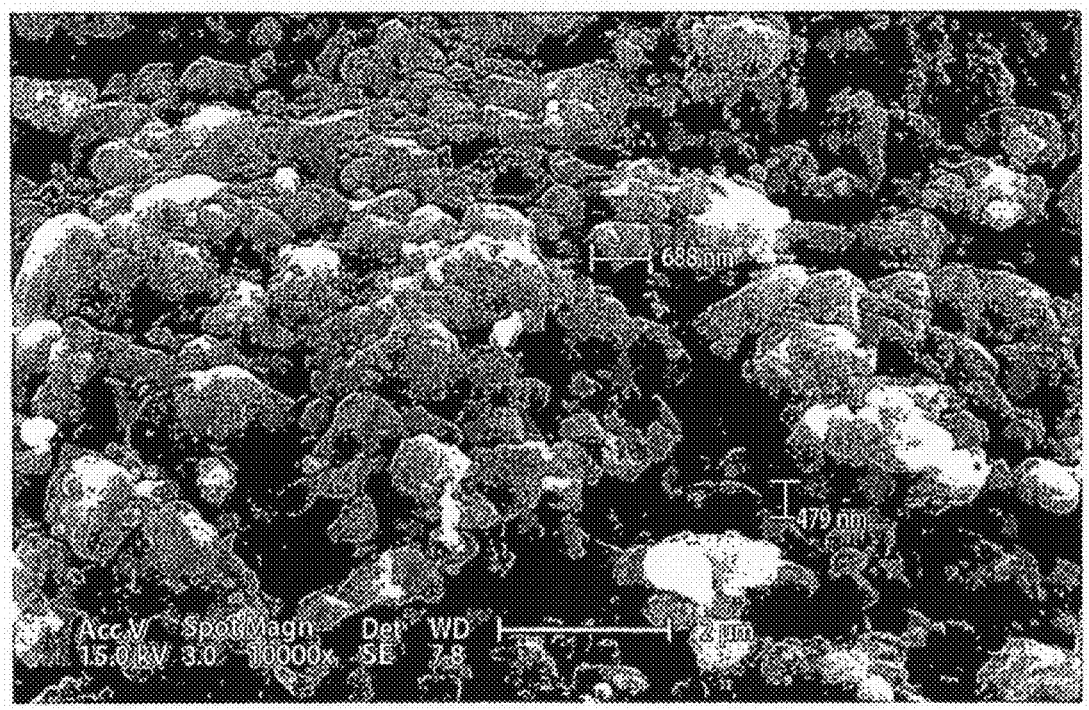
Figure 3C:
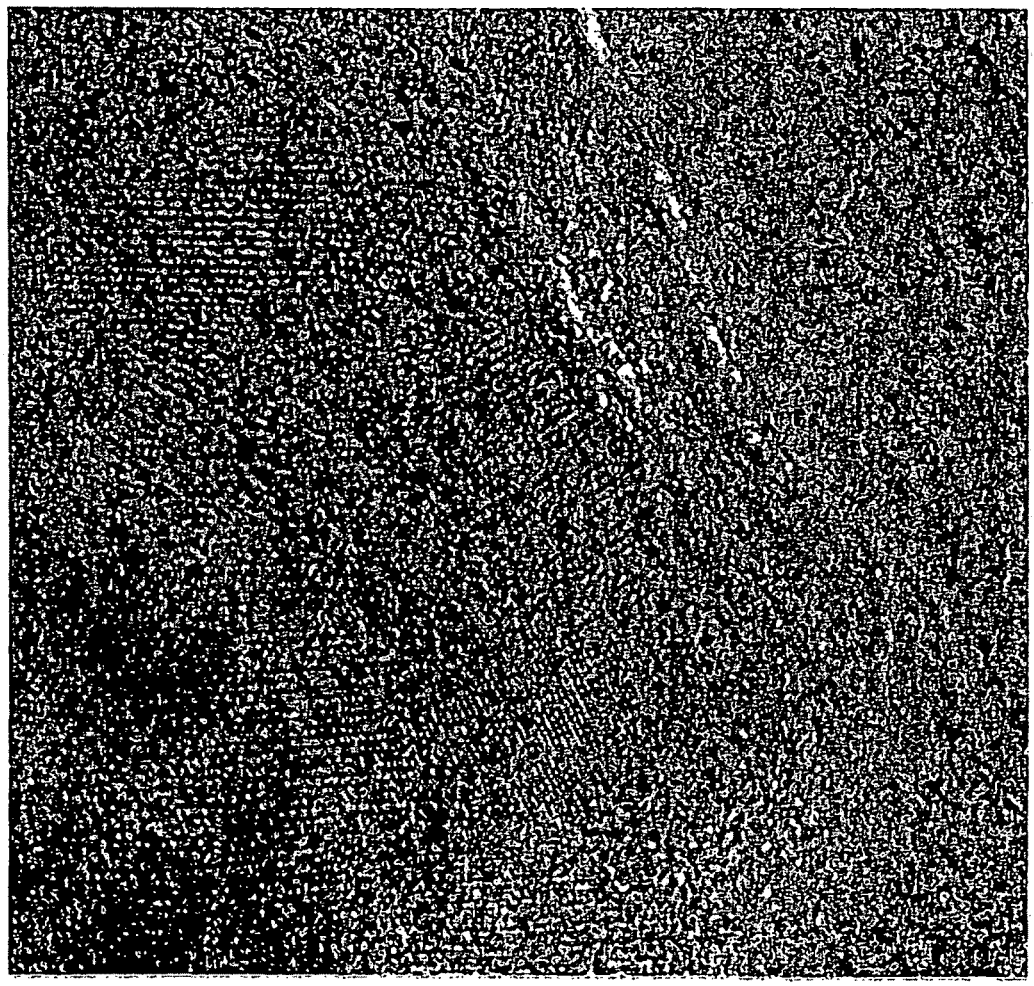

FIG. 3A is an SEM image for the non-coated stoichiometric LiFePO$_4$. The particle size was approximately 0.6 micrometers. FIG. 3B is an SEM image of the same material, after coating. The particle size remained approximately 0.6 micrometers. FIG. 3C is a TEM image of similar particles.

Figures 5A, 5B:
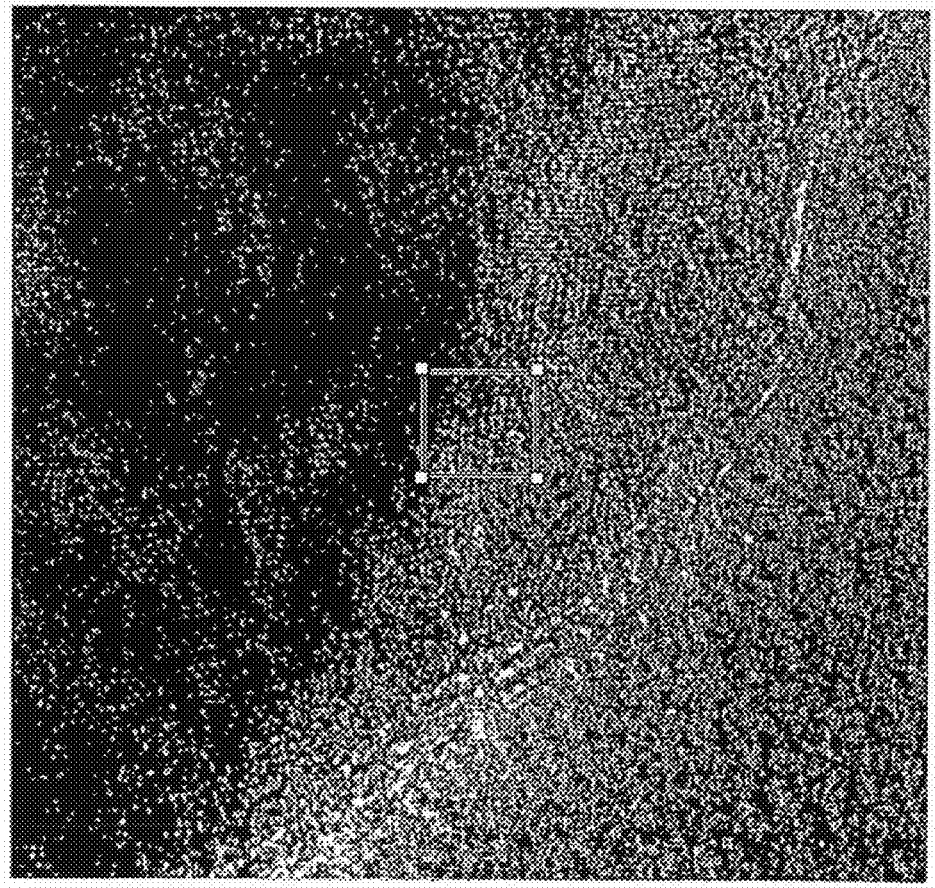
FIGS. 5A-5D are TEM photomicrographs illustrating various particles formed using ex situ techniques, according to one embodiment of the invention.
Figure 5C:
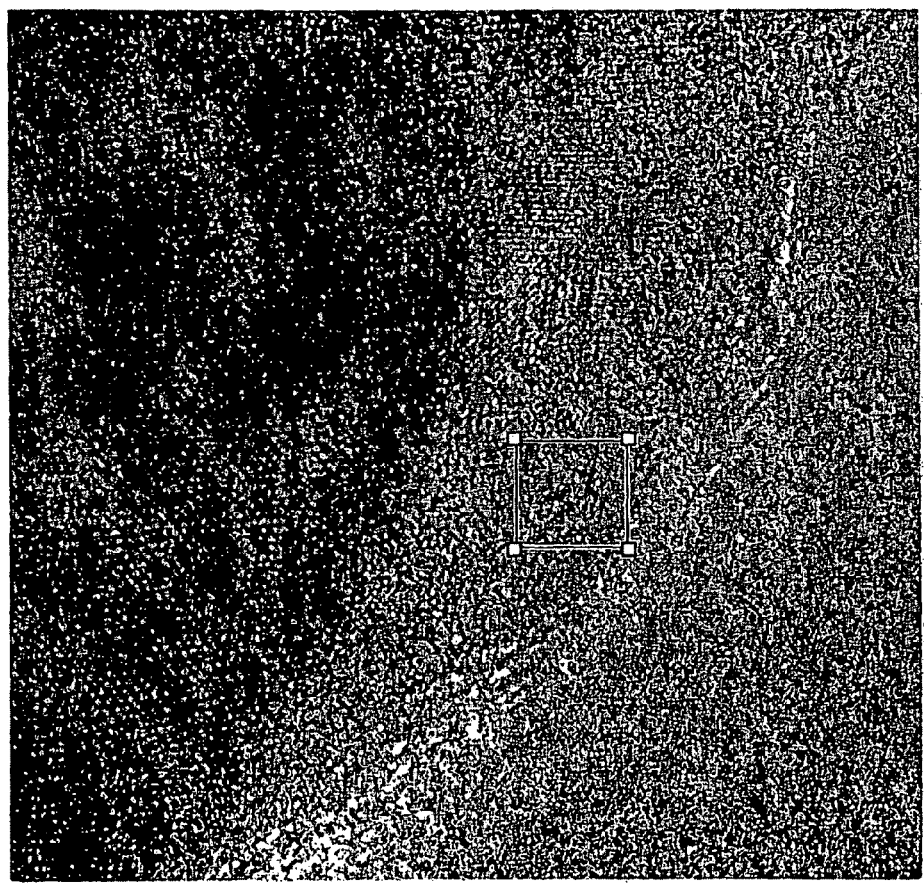
Figure 5D:
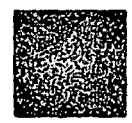

In FIG. 5A, a TEM image of an ex situ coated particle is shown. The particle size is about 0.6 micrometers. FIG. 5B is a diffraction pattern for the square region of FIG. 5A, illustrating that the region appears crystalline. In this example, the precursors were LiOH.H$_2$O (1.0639 g), Fe(NO$_3$)$_3$.9H$_2$O (10.2436 g), and NH$_4$H$_2$PO$_4$ (2.9165 g) under 5% H$_2$ and 95% Ar. Similarly, in FIG. 5C, an amorphous region is identified, with FIG. 5D illustrating a diffraction pattern of the square region in FIG. 5C, showing that the region appears to be amorphous, or at least poorly crystalline. As can be seen in FIG. 5, the edge of grain is amorphous or poorly crystalline, as compared to grain inside. Thus, the coating materials can be applied to normal olivine materials.

Example 3

Figure 9A:
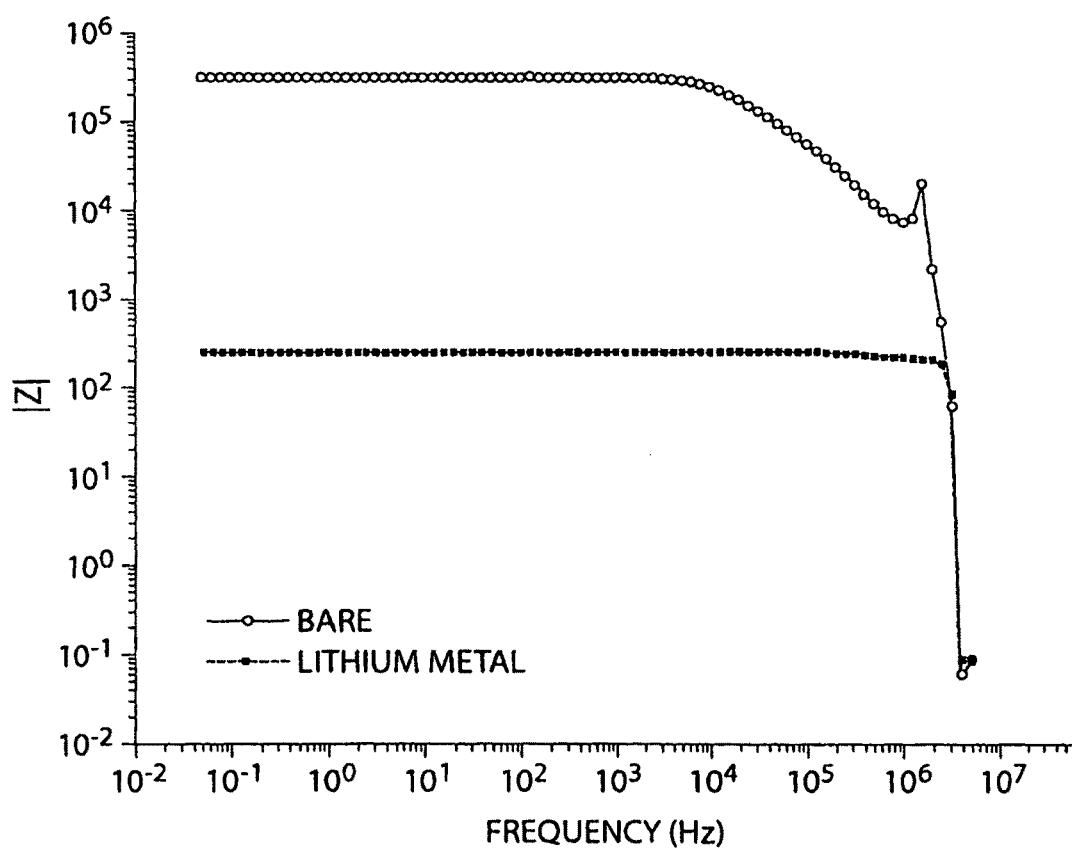
FIGS. 9A-9B illustrate conductivity data for certain embodiments of the invention.

In this example, the conductivity of various materials of the invention is illustrated, using different blocking electrodes. In FIG. 9A, the conductivity for a sample with molar ratio of Li to P=2 and no Fe content is shown. In this figure, "bare" represent lithium blocking electrodes, where only the electron is able to contribute to conductivity, while "lithium metal" represent a non-blocking electrode, i.e., where both the electron and lithium ions are able to contribute to the conductivity. This material was produced from the precursors $Li_2CO_3$ (1.8735 g) and $NH_4H_2PO_4$ (2.9166 g) under Ar, with two sintering steps at 350° C. and 700° C.

Figure 9B:
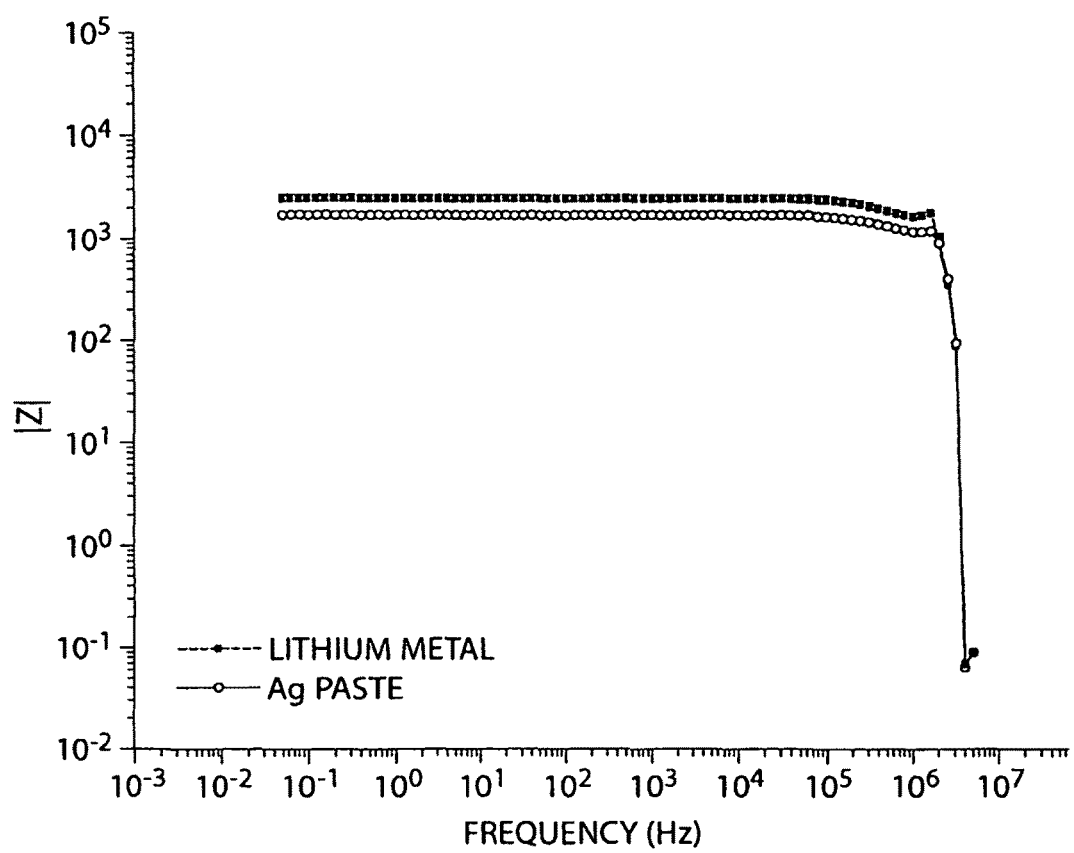

In FIG. 9B, the conductivity of a material with molar rations Li:P:Fe (2:1:0.1) is illustrated using different blocking electrodes. Silver paste ("Ag paste") was used for the lithium blocking electrode, as electrons were able to pass through the Ag paste. Lithium metal was used for the non-blocking electrodes, where both the electron and lithium ions can contribute to the overall conductivity. This material was produced by the precursors $Li_2CO_3$ (1.8735 g), $FeC_2O_4.H_2O$ (0.4561 g), and $NR_4H_2PO_4$ (2.9166 g) under Ar, with two sintering steps at 350° C. and 700° C. Higher electronic conductivities may be achieved by adding iron. The final composition of the particles was $Li_4P_2O_7/Li_3PO_4/LiFePO_4$ (small amount).

Example 4

This example illustrates that non-stoichiometric effects in materials can result in smaller particle sizes than stoichiometric materials, according to certain embodiments of the invention.

Figure 10A:
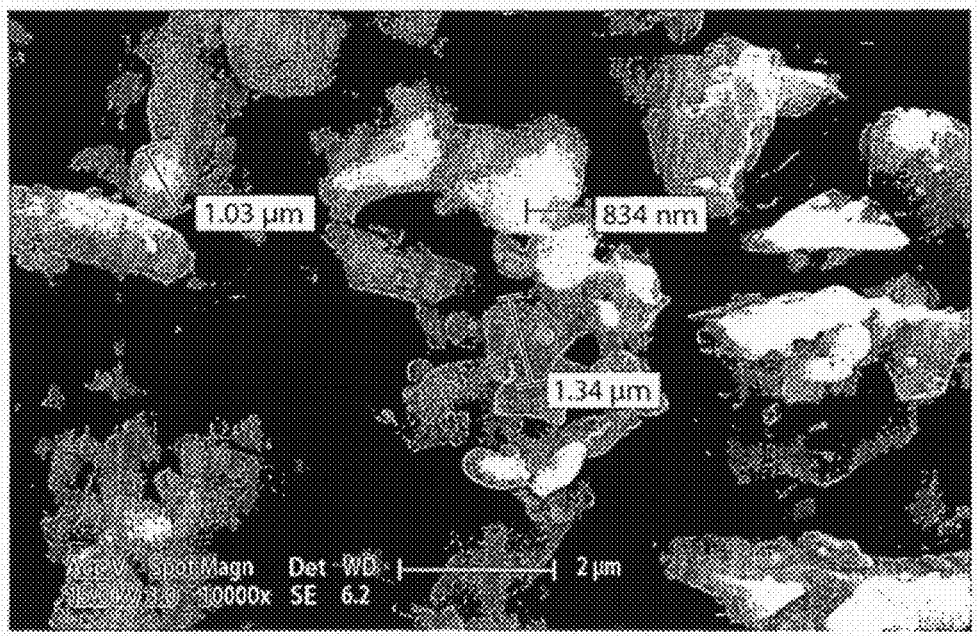
FIGS. 10A-10B are SEM photomicrographs illustrating various nitrogen-containing particles, in one embodiment of the invention.

FIG. 10A is an SEM image for a stoichiometric material ($LiFePO_4$) made from a reactant that can act as a nitrogen source ($NH_4NO_3$). The particle size in this image was around 1.2 micrometers. The particles were formed using the precursors $LiOH.H_2O$ (1.0491 g), $Fe_2O_3$ (1.9961 g), and $NH_4H_2PO_4$ (2.8758 g) under 5% $H_2$ and 95% Ar. The final composition was $LiFePO_4/Fe_2P/Li_3P_4$.

Figure 10B:
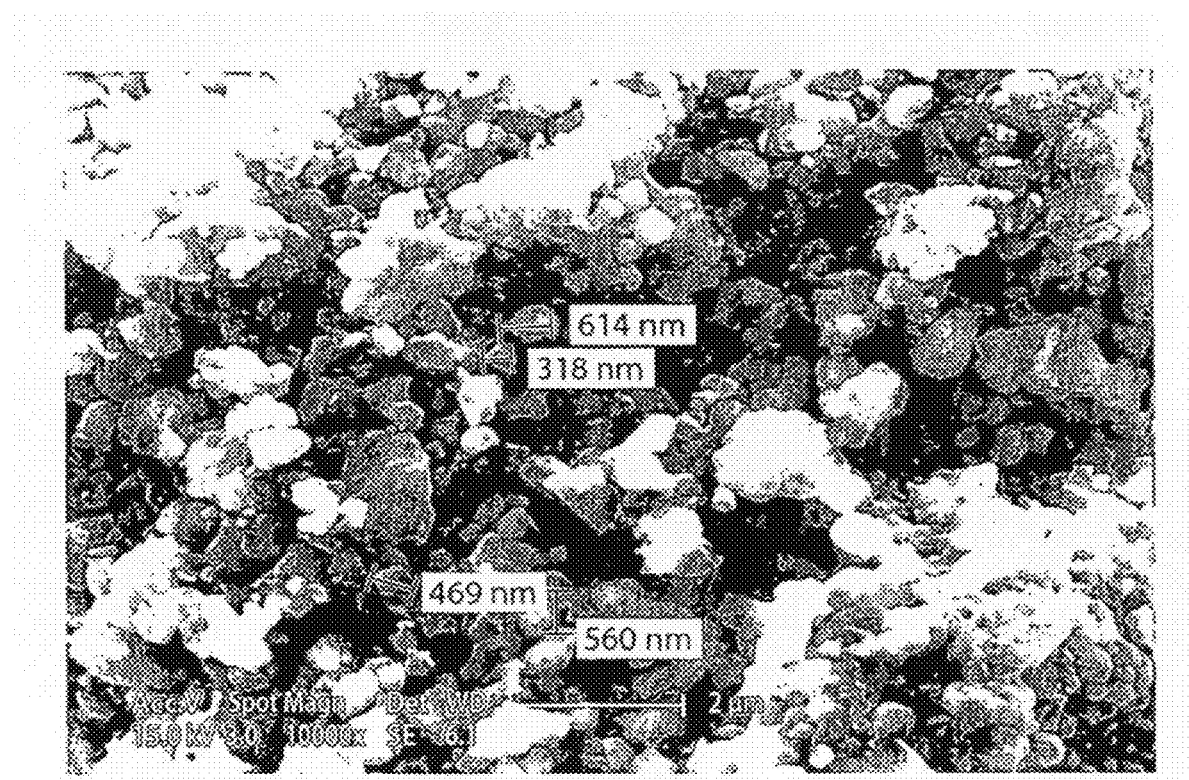

FIG. 10B is an SEM image for in situ coated non-stoichiometric material having the overall composition $LiFe_{1-2a}P_{1-a}O_4$, where a is 0.05 from a reactant that can act as a nitrogen source ($NH_4NO_3$). The particle size in this image was around 0.5 micrometers. The particles were formed using the precursors $LiOH.H_2O$ (1.0941 g), $Fe_2O_3$ (1.7965 g), and $NH_4H_2PO_4$ (2.7320 g) under 5% $H_2$ and 95% Ar. The final composition was $LiFePO_4/Li_3PO_4/Li_4P_2O_7/Fe_2P$.

Example 5

Figure 11:
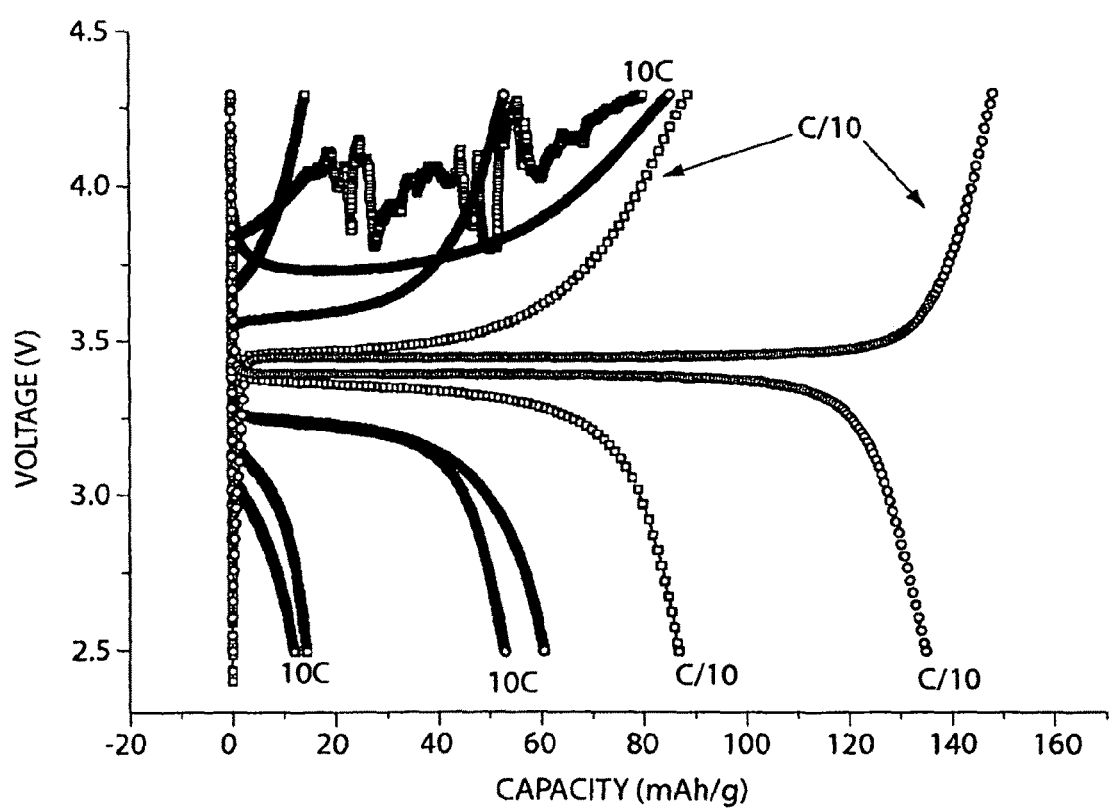
FIG. 11 illustrates electrochemical performance data for certain nitrogen-containing particles, in another embodiment of the invention.

In this example, the electrochemical performance of a stoichiometric material from a reactant that can act as a nitrogen source ($NH_4NO_3$), and the electrochemical performance of a non-stoichiometric material from a reactant that can act as a nitrogen source are compared. These results are shown in FIG. 11. These results were generated by charging and discharging the materials at various discharge rates, and determining the capacity of the material. In this figure, the squares represent the stoichiometric material, while the circles represent the non-stoichiometric material. These data show that nitrogen involvement with non-stoichiometric materials may provide certain advantages.

Example 6

Figure 12A:
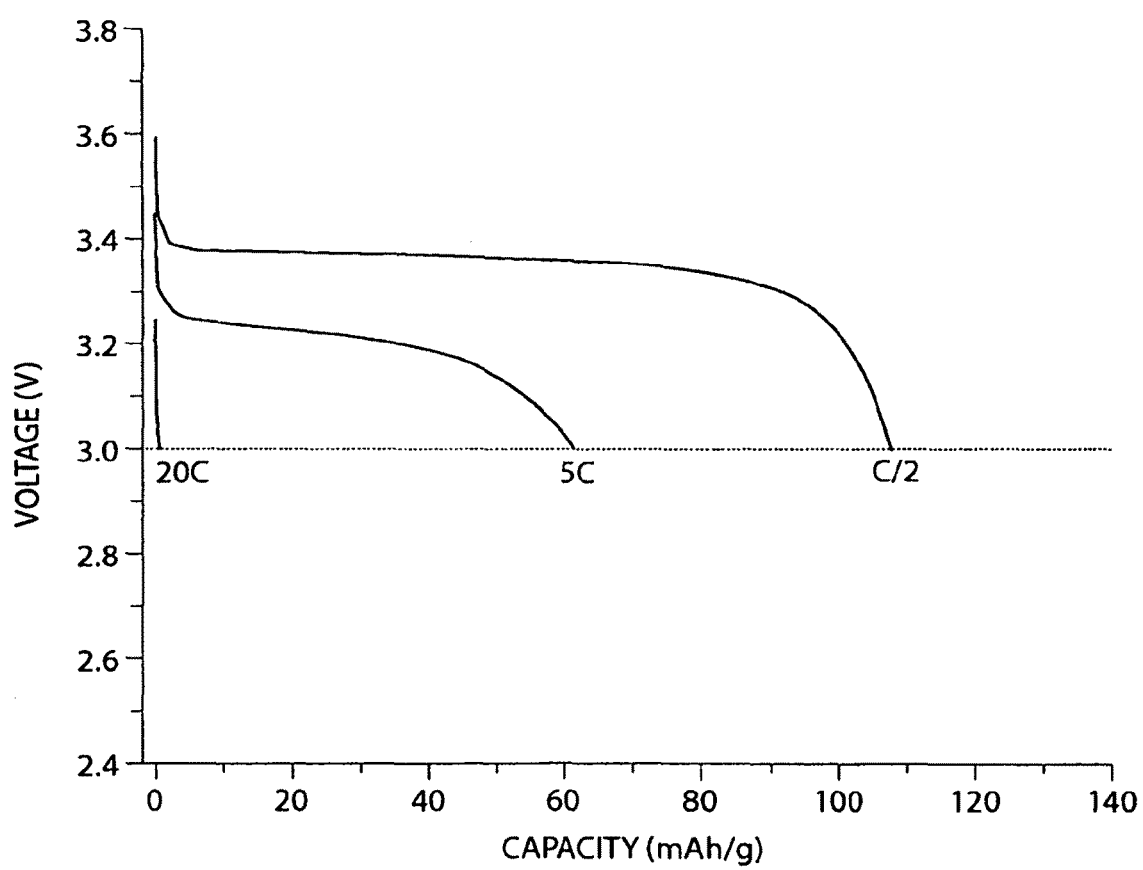
FIGS. 12A-12E illustrate electrochemical performance data for various embodiments of the invention.
Figure 12B:
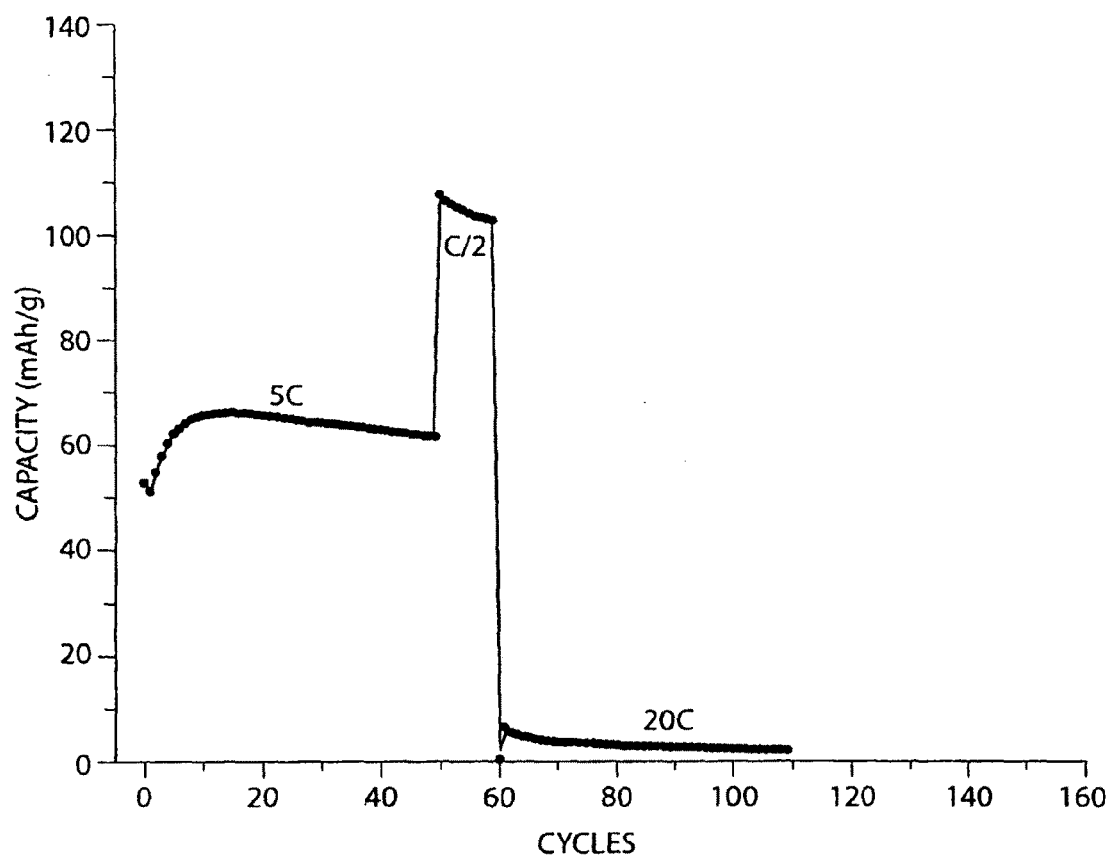

In this example, the electrochemical performances for various materials of the invention are shown. In FIG. 12A, the discharge of a stoichiometric material ($LiFePO_4$) without a coating is shown. This material was produced using the precursors $Li_2CO_3$, $FeC_2O_4.2H_2O$, and $NH_4H_2PO_4$, at stoichiometric ratios (in amounts of $Li_2CO_3$ (0.9369 g), $FeC_2O_4.2H_2O$ (4.5619 g), and $NH_4H_2PO_4$ (2.9169 g)), under Ar. FIG. 12B shows the cyclability of the same material. Discharge rates are as shown in the figure.

Figure 12C:
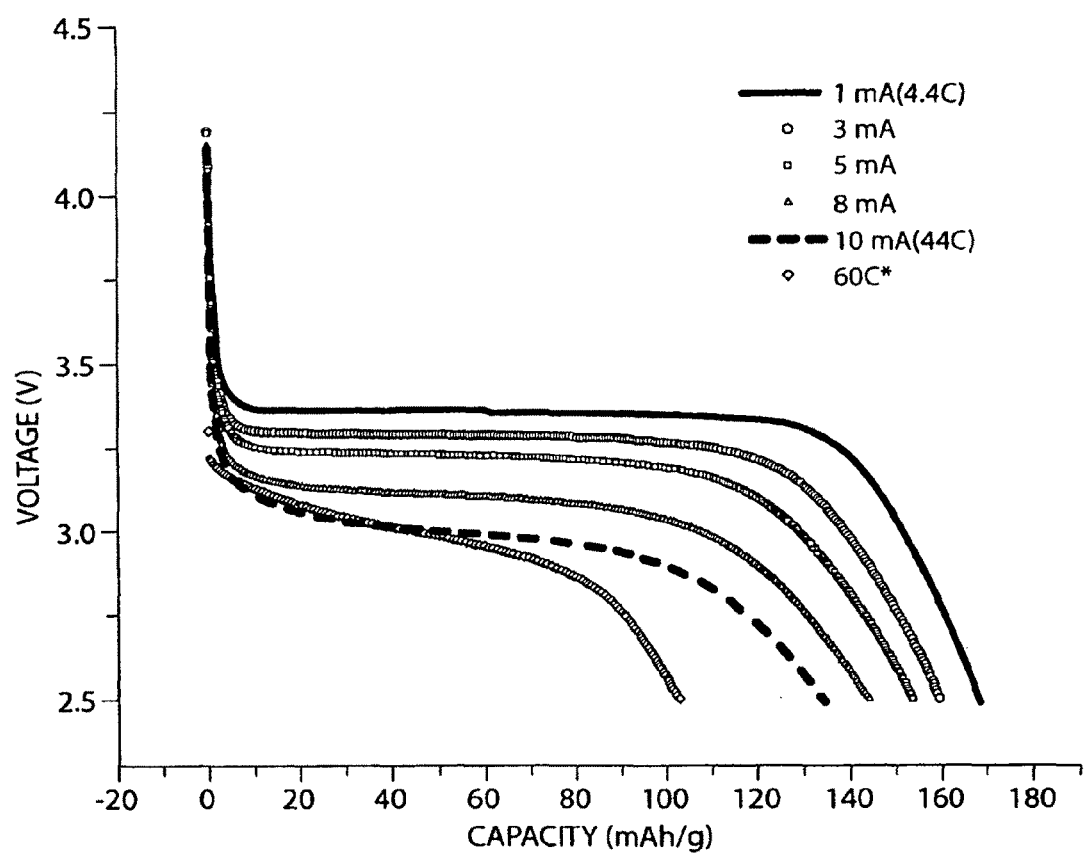
Figure 12D:
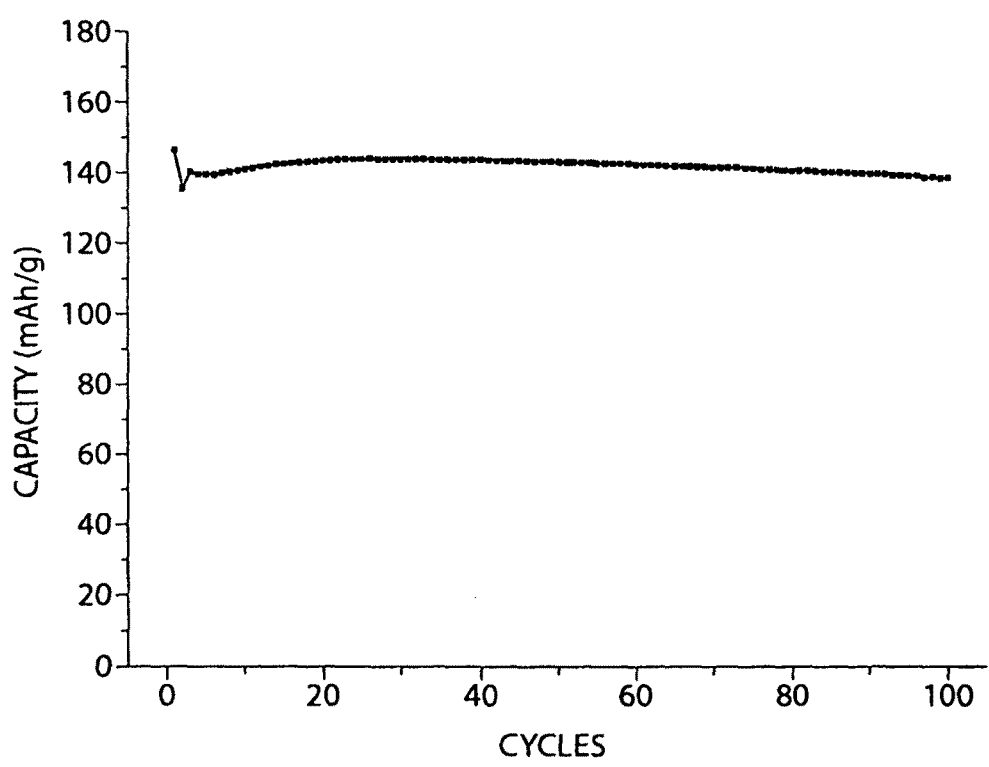
Figure 12E:
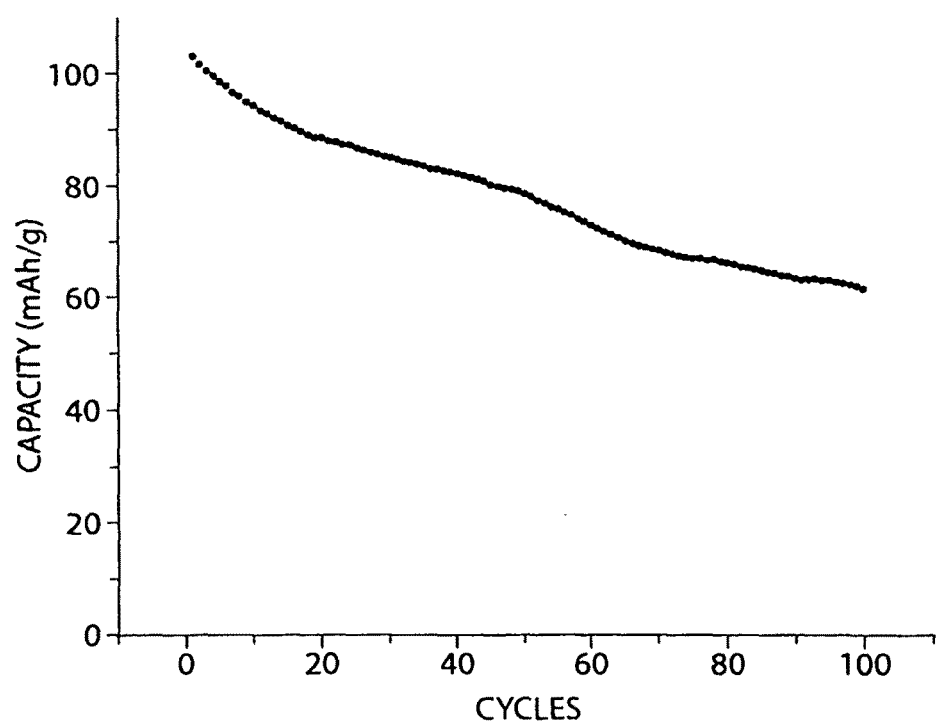

In contrast, FIG. 12C shows the rate capability for certain in situ surface coating materials using non-stoichiometric ratios. The particle size was roughly 50 nm. These data were generated using a constant current constant voltage ("CCCV") method. In this method, the material is charged at constant current (C/2), and after reaching 4.3 V, is charged at a constant 4.3 V until the current reaches 0.00001 A. The particles in this example were produced using the precursors $Li_2CO_3$ (0.9369 g), $FeC_2O_4.H_2O$ (4.1057 g), and $NH_4H_2PO_4$ (2.7710 g) under Ar. The final composition of the particles was $LiFePO_4/Fe_2P$(small amount). FIG. 12D shows the cyclability of the same material at 20 C, while FIG. 12E shows the cyclability of the same material at 60 C.

Example 7

Figure 13A:
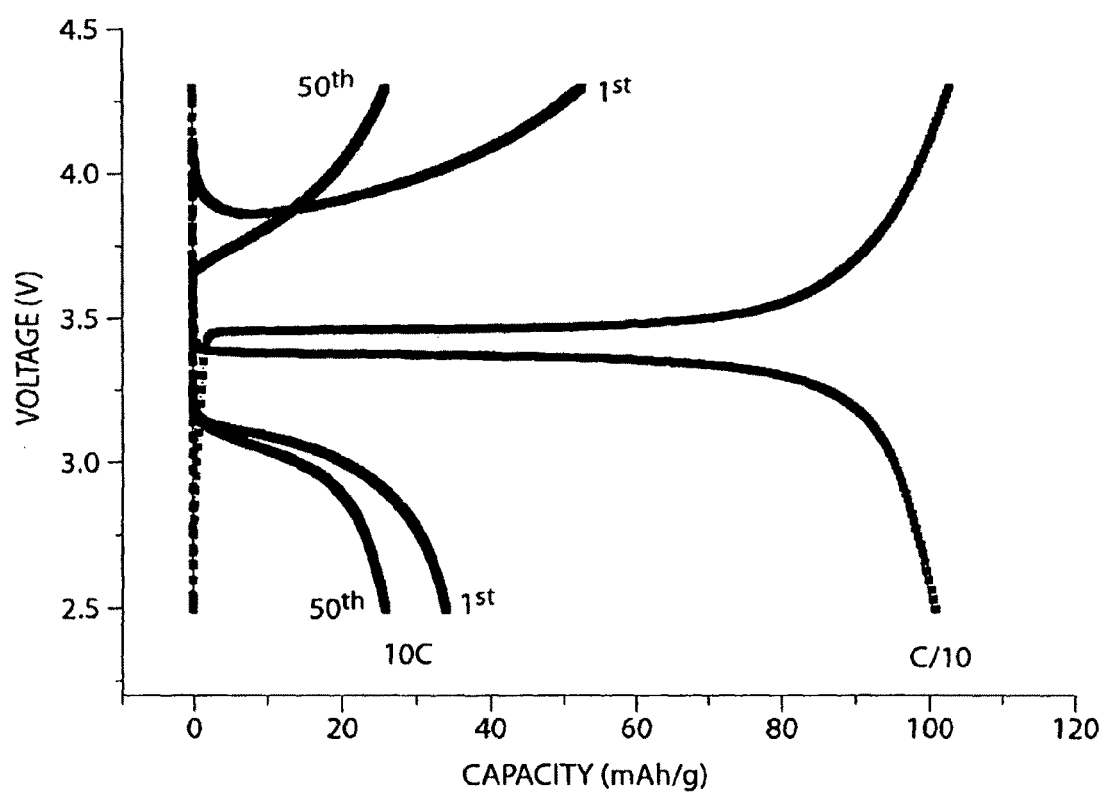
FIGS. 13A-13B illustrate electrochemical performance data for various embodiments of the invention.
Figure 13B:
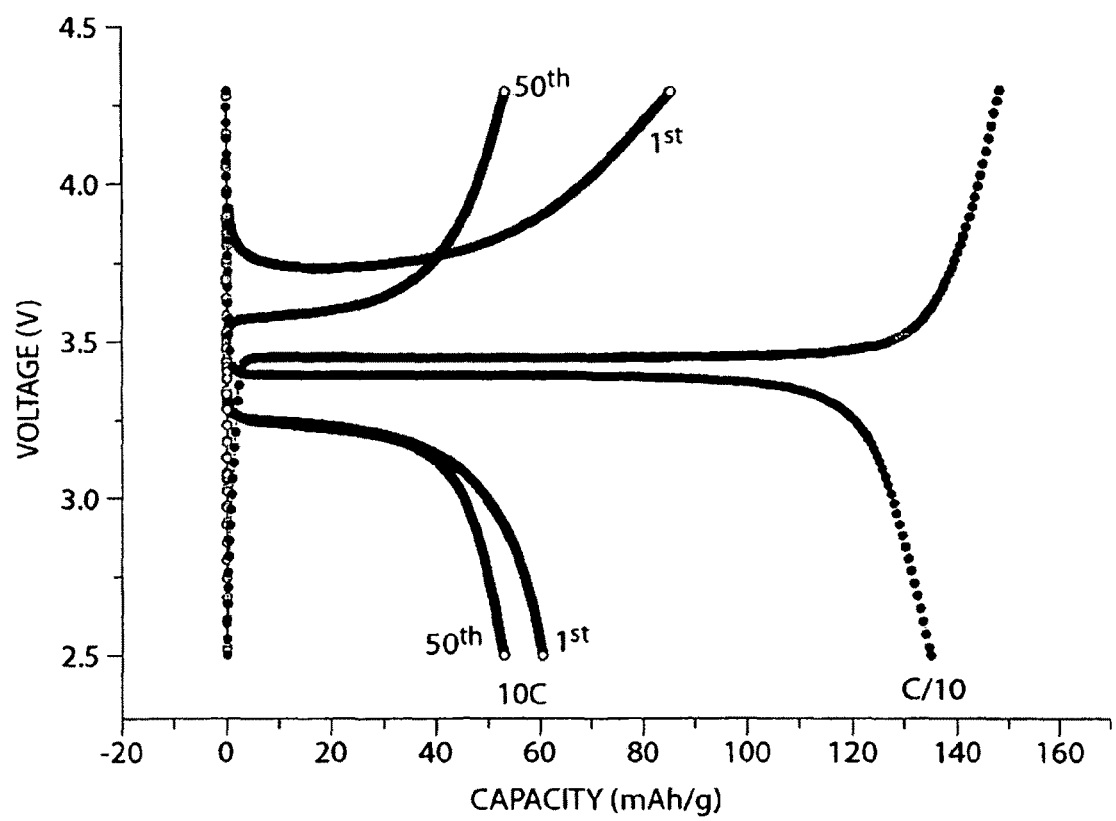

In this example, various properties of an in situ coated, non-stoichiometric material are illustrated. Here, the material was formed using the precursors $LiOH.H_2O$ (1.0491 g), $Fe_2O_3$ (1.7065 g), and $NH_4H_2PO_4$ (2.7320 g) under 5% $H_2$ and 95% Ar. The final composition of the particles was $LiFePO_4/Li_3PO_4/Li_4P_2O_7/Fe_2P$. FIG. 13A shows the electrochemical performance for stoichiometric materials ($LiFePO_4$) in the absence of a coating. The particle size was about 1 micrometer. FIG. 13B shows the electrochemical performance for a non-stoichiometric material coated by using a nitrogen source such as $NH_4NO_3$. The particle size was about 0.5 micrometers.

Example 8

In this example, two sets of particles having similar average sizes (about 700 nm) are illustrated. One set of particles have been surface-modified using an ex situ coating. In both cases, the material was formed using the precursors $LiOH.H_2O$ (1.0639 g), $Fe(NO_3)_3.9H_2O$ (10.2436 g), and $NH_4H_2PO_4$ (2.9165 g) under 5% $H_2$ and 95% Ar. The final compositions of the particles were $LiFePO_4/Li_3PO_4$ and $LiFePO_4/Li_3PO_4/Li_4P_2O_7$ (for the surface modified case).

Figure 14A:
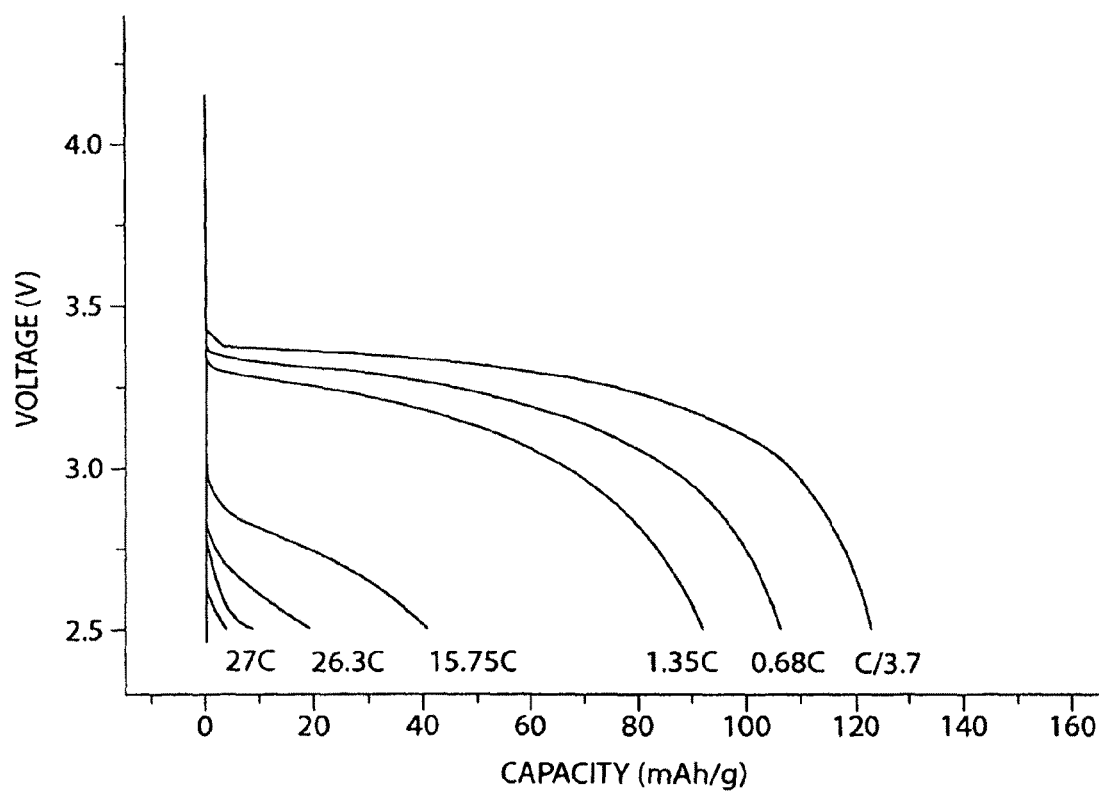
FIGS. 14A-14C illustrate rate data for certain embodiments of the invention.
Figure 14B:
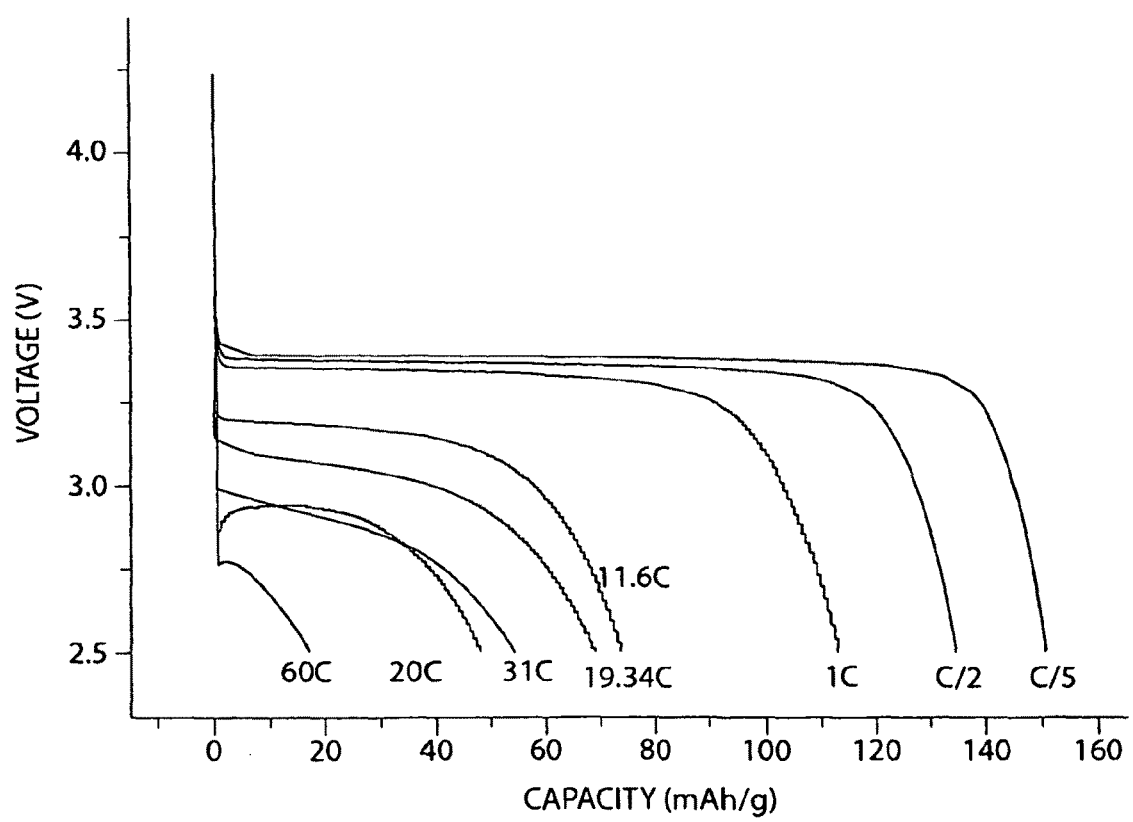
Figure 14C:
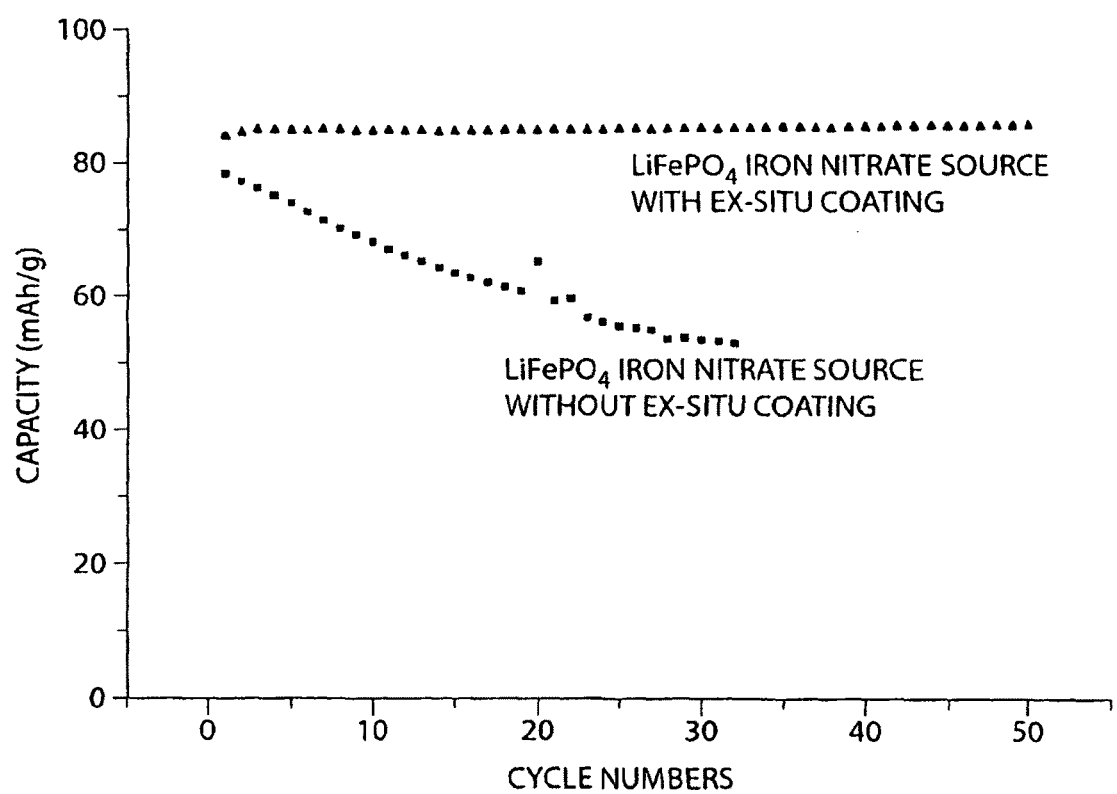

In FIG. 14A, the rate capability for a stoichiometric material without a coating is shown. The particle size was about 0.6 micrometers. In contrast, in FIG. 14B, the rate capabilities for the material after ex situ coating is shown. Again, the particle size was about 0.6 micrometers. FIG. 14C shows a comparison of the cyclability of both materials. The squares represent the material without an ex situ coating, while the triangles represent the material having an ex situ coating, showing much improved cyclability.

Example 9

This example illustrates the production of particles using an in situ coating technique with a deficiency Mn and P, relative to Li and O within the overall particle. The starting materials in this example were lithium carbonate ($Li_2CO_3$), manganese oxalate ($MnC_2O_4.2H_2O$), and $NH_4H_2PO_4$, Ball milling in an acetone solvent was used to form a homogeneous mixture. The ball milling container was a polypropylene bottle and the ball millers were spherical zirconia balls (having radii of 3 mm or 5 mm). Ball milling was performed overnight (about 12 h). After ball milling, the homogenized mixture was dried using a hot plate with magnetic stirring. The dried materials were pelletized by a disk type mold using a manual press.

A two-step heating method was used. Heating was performed under argon (Ar). First, the material was heated to 350° C. to decompose the organic sources (carbonate, oxalate, and ammonium dihydrogen phosphate). This was performed under Ar using a tube furnace. Next, the materials were ground by an agate mortar. The materials were then heated at 700° C. under Ar. After finishing heat treatment, the resulting particles were characterized using various techniques, including XRD and electrochemical tests.

Figure 15A:
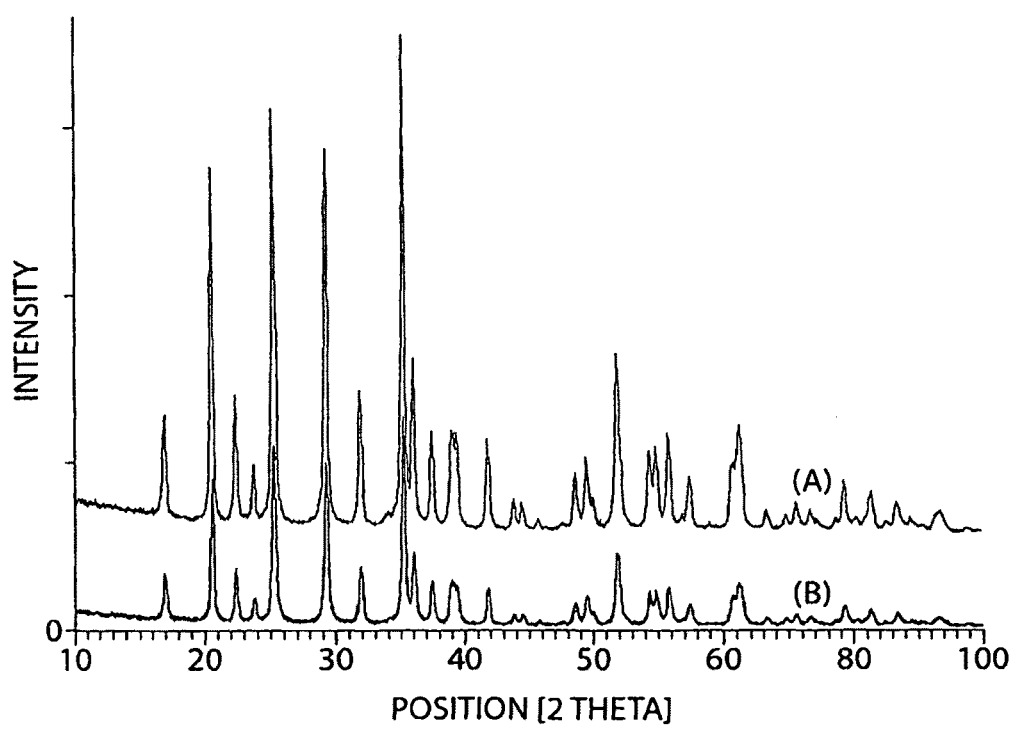
FIGS. 15A-15C illustrate XRD and electrochemical performance data for certain embodiments of the invention.

Two samples were made either varying the ratio of the reactants to change the stoichiometry. A stoichiometric sample was made from $Li_2CO_3$ (0.9368 g), $MnC_2O_4.2H_2O$ (4.7653 g), and $NH_4H_2PO_4$ (2.9167 g) according to the procedure outlined above using an Ar atmosphere to heat the materials. FIG. 15A is an XRD measurement of this material, showing the $LiMnPO_4$ phase (no coating present). The particle size is roughly 100 nm. The final composition of the particles was $LiMnPO_4$.

Non-stoichiometric particles were formed using the precursors $Li_2CO_3$ (0.9368 g), $MnC_2O_4.2H_2O$ (4.0845 g), and $NH_4H_2PO_4$ (2.7708 g) under Ar. The overall composition of product synthesized by these reactants was $LiMn_{1-2a}P_{1-a}O_{4-\delta}$, where a is 0.05. (B) in FIG. 15A is XRD measurement for in situ coated particles produced non-stoichiometrically and for non-coating particles produced stoichiometrically. The particle size based on XRD refinement was less than 50 nm. The final composition of the core was $LiMnPO_4$. The coating included amorphous or crystalline material with composition in the range $Li_4P_2O_7$—$Li_3PO_4$ with small amount of Mn, C, and N. X-ray photoelectron spectroscopy (XPS) was used to show that nitrogen is present in the surface.

Figure 15B:
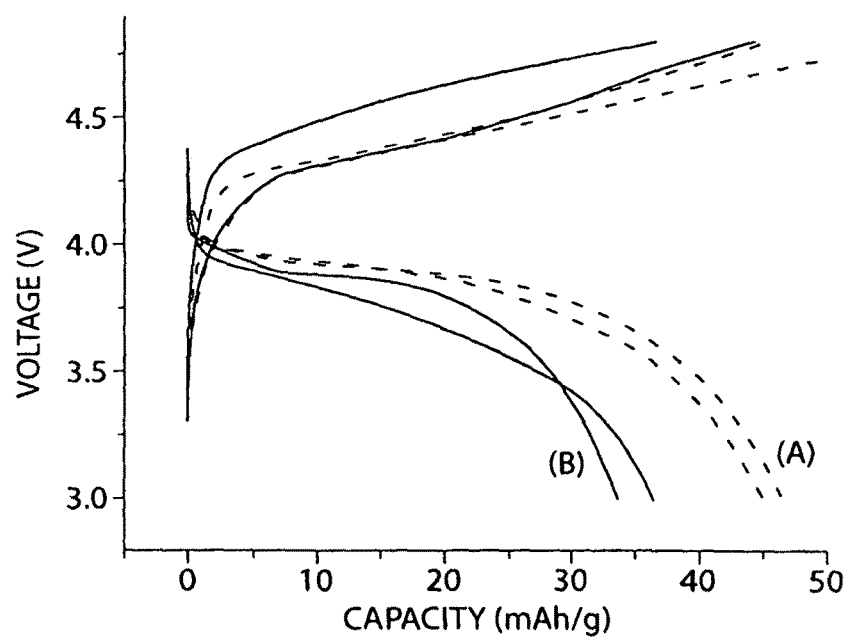
Figure 15C:
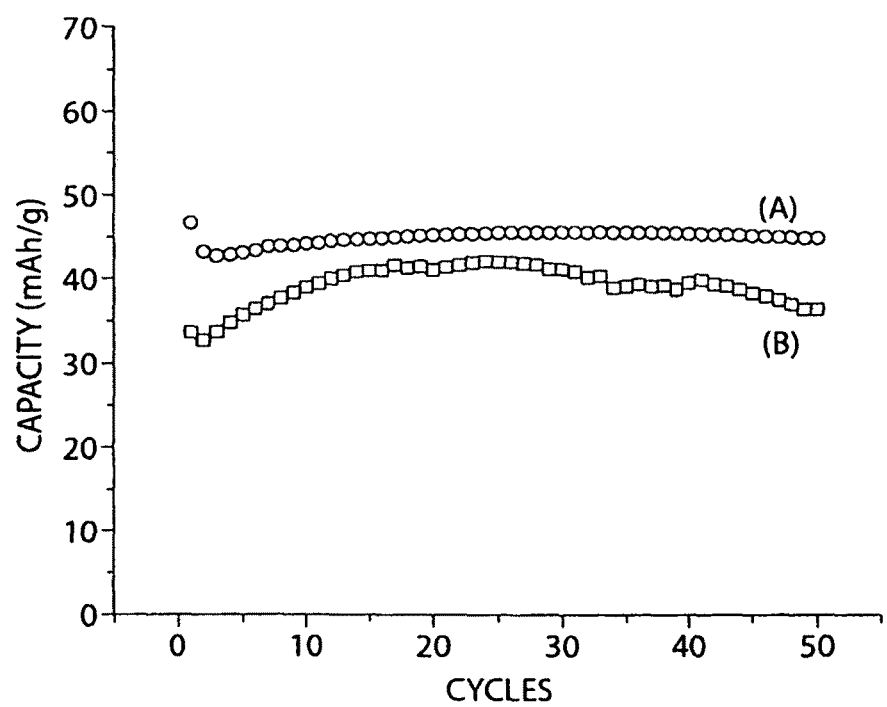

FIGS. 15B and C show the electrochemical performance of non coating material (B) and in situ coated material (A) in terms of rate capability and cyclability. In these figures, in situ coated material show smaller overpotential and better cyclability than non-coated material.

Example 10

Figure 16A:
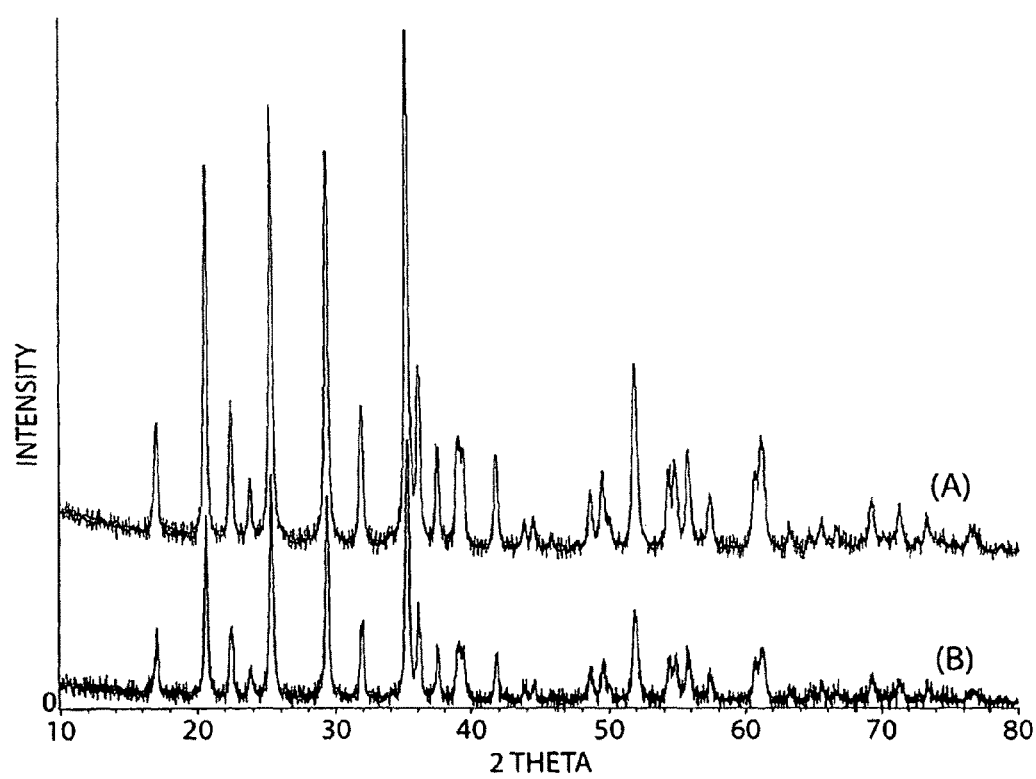
FIGS. 16A-16F illustrate data for various embodiments of the invention.

This example illustrates the production of particles using an in situ coating technique with an excess Li and P (2:1), relative to Mn and O within the overall particle. The starting materials in this example were lithium carbonate ($Li_2CO_3$), manganese oxalate ($MnC_2O_4.2H_2O$), and $NH_4H_2PO_4$, Two samples were made either varying the ratio of the reactants to change the stoichiometry. A stoichiometric sample was made from $Li_2CO_3$ (0.9368 g), $MnC_2O_4.2H_2O$ (4.7653 g), and $NH_4H_2PO_4$ (2.9167 g) according to the procedure outlined above using an Ar atmosphere to heat the materials. (B) in FIG. 16A is an XRD measurement of this material and shows $LiMnPO_4$ phase (no coating present). The particle size was roughly 100 nm. The final composition of the particles was $LiMnPO_4$.

Figure 16B:
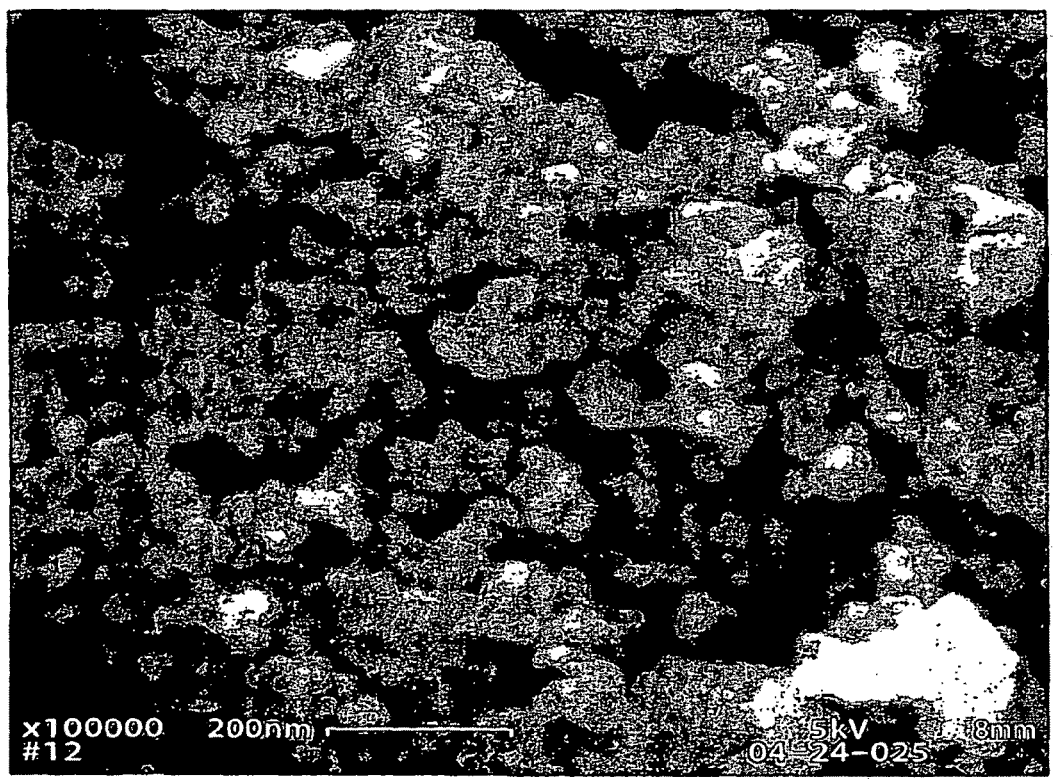
Figure 16C:
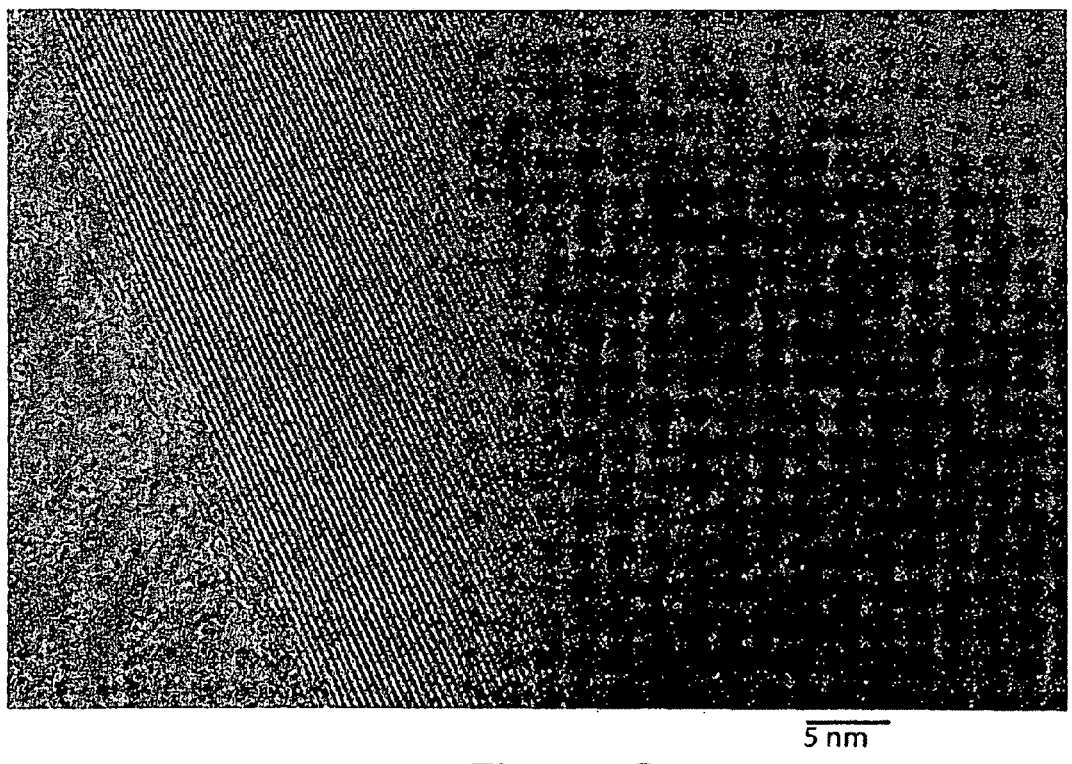

Non-stoichiometric particles were formed using the precursors $Li_2CO_3$ (1.030 g), $MnC_2O_4.2H_2O$ (4.5384 g), and $NH_4H_2PO_4$ (3.0625 g) under Ar. The overall composition of product synthesized by these reactants was $Li_{1+2a}MnP_{1+a}O_{4+\delta}$, where a is 0.05. FIG. 16B show SEM images for in situ coated particles produced non-stoichiometrically. FIG. 16C is a high resolution TEM image for in situ coated materials and shows in situ coated material has coating layer, which is less than 5 nm. The particle size in these images was less than 50 nm. The final composition of the core was $LiMnPO_4$. The coating included amorphous or crystalline material with composition in the range $Li_4P_2O_7$—$Li_3PO_4$ with small amount of Mn, C, and N. X-ray photoelectron spectroscopy (XPS) was used to show that nitrogen is present in the surface.

Figure 16D:
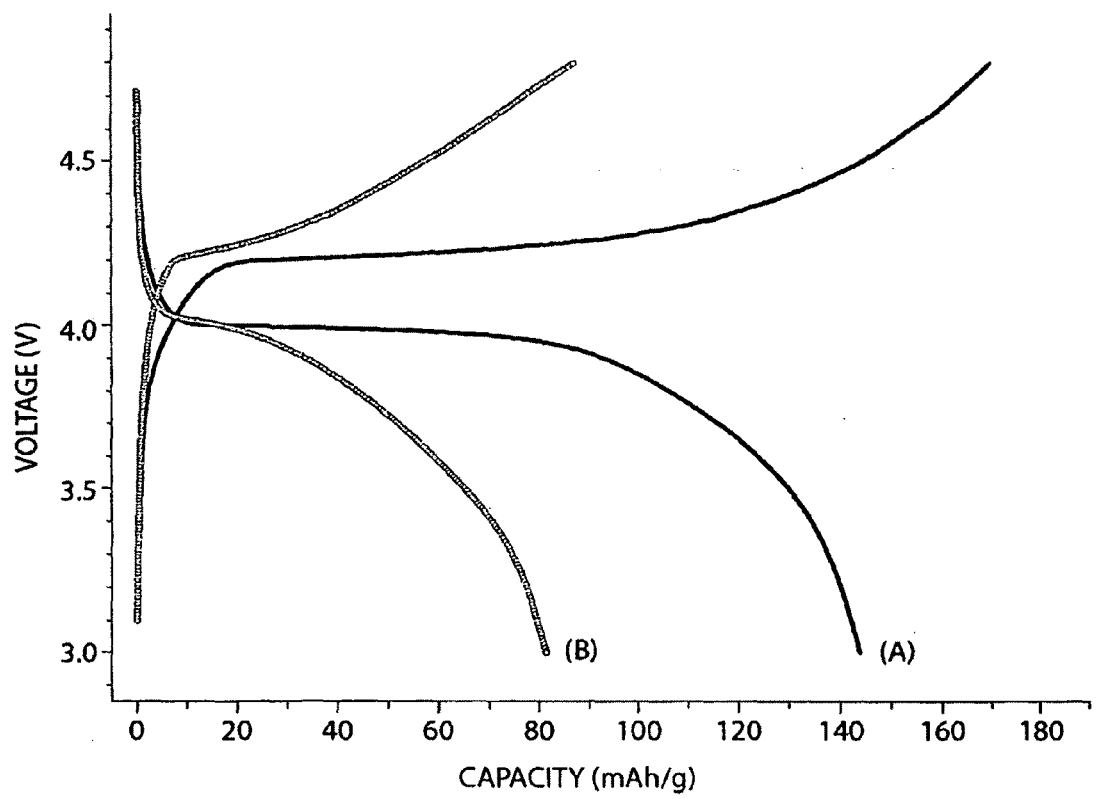
Figure 16E:
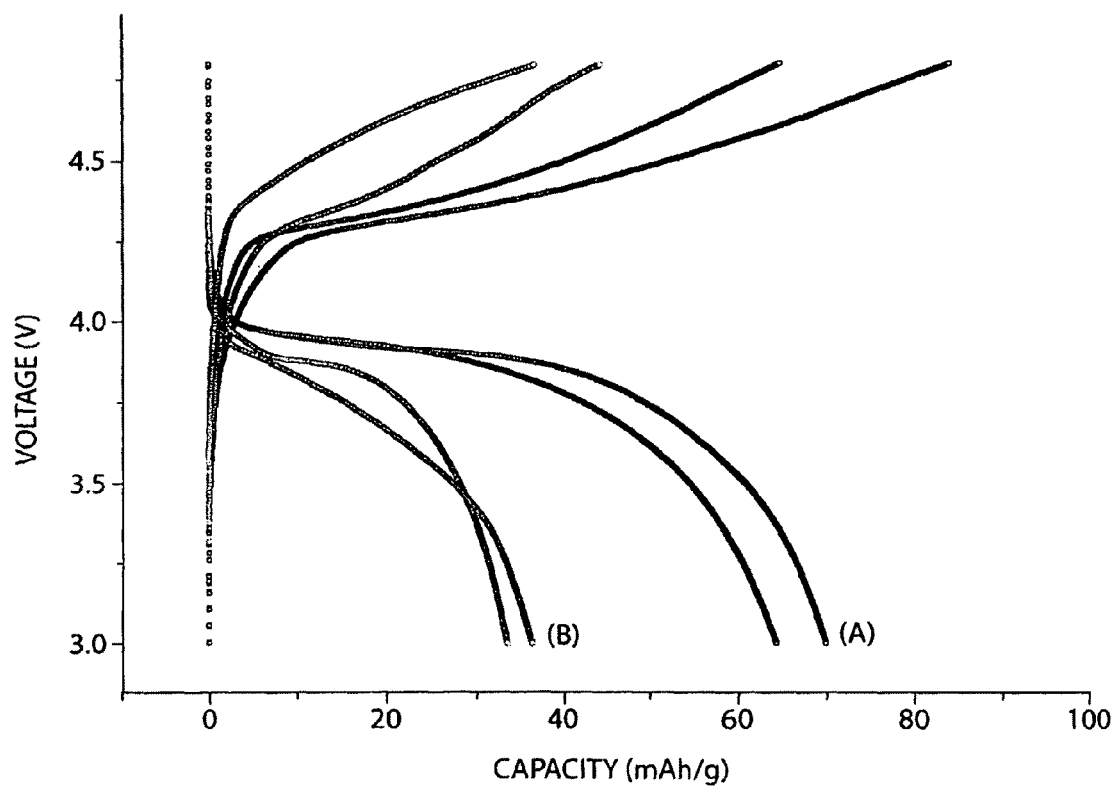
Figure 16F:
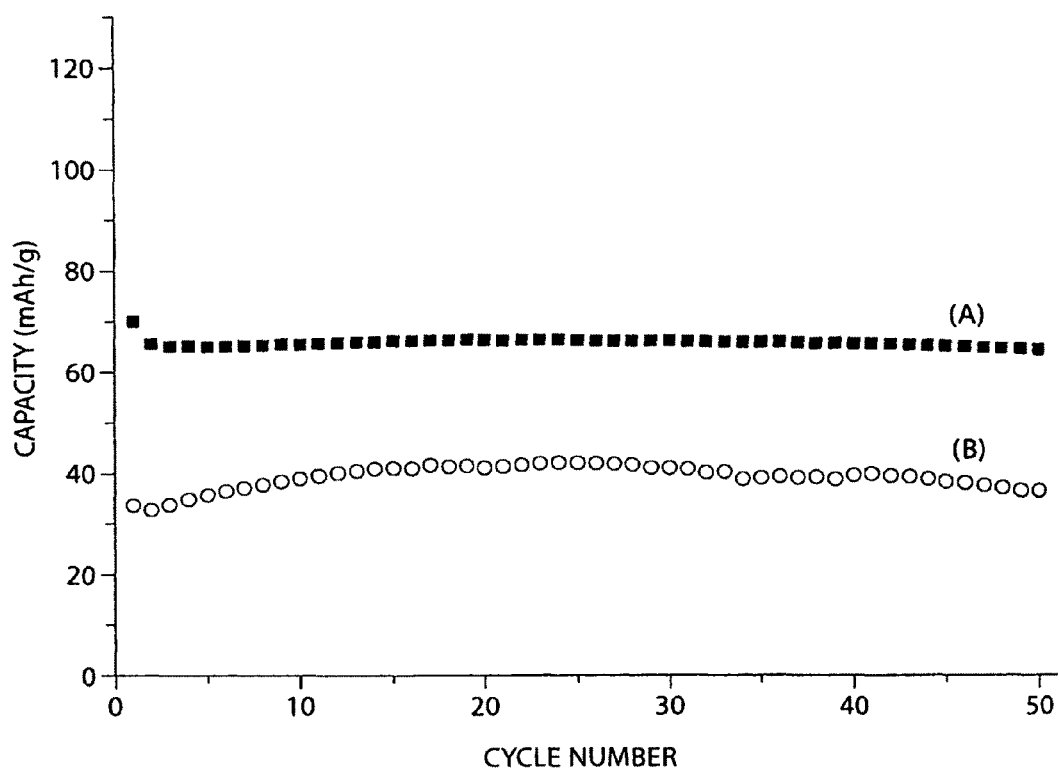

FIGS. 16D, E, and F show the electrochemical performance of non coating material (B) and in situ coated material (A) in terms of rate capability and cyclability. In these figures, the in situ coated materials showed better performance than non-coated material.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereof, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a coated particle having a core and a coating surrounding at least a portion of the core, the coating having a composition:

$Li_xM_yP_zN_wO_m$, wherein x, y, z, w, and m are each independently greater than 0, and M comprises one or more transition metals, and wherein:
(y/x) is a number less than or equal to about 0.3,
(x/z) is a number between, inclusively, about 1.25 and about 3,
m is greater than or equal to the quantity (x+2y+5z)/2 and less than or equal to the quantity (x+3y+5z)/2,
m is between, inclusively, about 1.6 and about 5.4, and
w is less than or equal to about 0.1.

2. The article of claim 1, wherein the coating appears amorphous in transmission electron microscopy.

3. The article of claim 1, wherein the coating appears amorphous.

4. The article of claim 1, wherein the coating has a different crystal structure than the core.

5. The article of claim 1, wherein the coating has an average thickness of less than about 70 nm.

6. The article of claim 1, wherein the core comprises $LiFePO_4$.

7. The article of claim 6, wherein the core consists essentially of $LiFePO_4$.

8. The article of claim 1, wherein the core comprises $LiMnPO_4$.

9. The article of claim 8, wherein the core consists essentially of $LiMnPO_4$.

10. The article of claim 1, wherein the core comprises $LiCoPO_4$.

11. The article of claim 1, wherein the core comprises $LiNiPO_4$.

12. The article of claim 1, wherein the core is essentially crystalline.

13. The article of claim 1, wherein the core has an average grain size of less than about 100 nm.

14. The article of claim 1, wherein y is less than z.

15. The article of claim 1, wherein the quantity (x/z) is a number between, inclusively, about 1 and about 1.5.

16. The article of claim 1, wherein the quantity (1−y)/(1−z) is a number between, inclusively, about 1.7 and about 2.3.

17. The article of claim 1, wherein M comprises at least one of iron, manganese, cobalt, and nickel.

18. The article of claim 1, wherein w is between, inclusively, about 0.01 and about 1.1.

19. An article, comprising:
a coated particle having a core and a coating surrounding at least a portion of the core, wherein the core comprises lithium and M, wherein M comprises one or more transition metals, and wherein the coating has a composition:

$Li_xM_yP_zN_wO_m$, and wherein x, y, z, w, and m are each independently greater than 0, and wherein:
(y/x) is a number less than or equal to about 0.3,
(x/z) is a number between, inclusively, about 1.25 and about 3,
m is greater than or equal to the quantity (x+2y+5z)/2 and less than or equal to the quantity (x+3y+5z)/2,
m is between, inclusively, about 1.6 and about 5.4, and
w is less than or equal to about 0.1.

20. An article, comprising:
a coated particle having a core and a coating surrounding at least a portion of the core, the particle having an overall composition:

$Li_xM_yP_zN_wO_m$, wherein:
x is between, inclusively, about 0.01 and about 1.1,
y is between, inclusively, about 0.5 and about 1.1,
z is between, inclusively, about 0.5 and about 1.1,
w is between, inclusively, 0 and about 0.1,
m is between, inclusively, about 1.6 and about 5.4, and
M comprises one or more transition metals.

* * * * *